US010410389B2

(12) United States Patent
McDonald

(10) Patent No.: US 10,410,389 B2
(45) Date of Patent: Sep. 10, 2019

(54) EDITING INTERFACE FOR VIDEO COLLABORATION CAMPAIGNS

(71) Applicant: Super 6 LLC, Denver, CO (US)

(72) Inventor: Scott McDonald, Denver, CO (US)

(73) Assignee: Super 6 LLC, Denver, CO (US)

(*) Notice: Subject to any disclaimer, the term of this patent is extended or adjusted under 35 U.S.C. 154(b) by 0 days.

(21) Appl. No.: 15/789,123

(22) Filed: Oct. 20, 2017

(65) Prior Publication Data
US 2018/0150985 A1  May 31, 2018

Related U.S. Application Data

(63) Continuation of application No. 15/364,258, filed on Nov. 30, 2016, now Pat. No. 9,824,477.

(51) Int. Cl.
H04N 5/225 (2006.01)
H04N 5/222 (2006.01)
G06T 11/60 (2006.01)
G06Q 30/02 (2012.01)
H04N 1/00 (2006.01)
H04N 5/232 (2006.01)
H04N 5/262 (2006.01)

(52) U.S. Cl.
CPC .......... G06T 11/60 (2013.01); G06Q 30/0276 (2013.01); H04N 1/00209 (2013.01); H04N 1/00244 (2013.01); H04N 5/23216 (2013.01); H04N 5/23222 (2013.01); H04N 5/23293 (2013.01); G06T 2200/24 (2013.01)

(58) Field of Classification Search
CPC .......... H04N 5/23216; H04N 5/23222; H04N 5/23293; H04N 1/00244; H04N 1/00209; G06T 11/60; G06T 2200/24; G06Q 30/0276
See application file for complete search history.

(56) References Cited

U.S. PATENT DOCUMENTS 6,301,440 B1  10/2001  Bolle et al.
7,417,672 B2  8/2008  Nakajima
(Continued)

OTHER PUBLICATIONS

Kim, Harry, "International Search Report and Written Opinion Re PCT/US17/63770", dated Mar. 26, 2018, p. 10.
Vu, Ngoc Yen T, "United States Office Action Re U.S. Appl. No. 15/364,258", dated Mar. 23, 2017, p. 26, Published in: US.
(Continued)

Primary Examiner — Ngoc Yen T Vu
(74) Attorney, Agent, or Firm — Neugeboren O'Dowd PC

(57) ABSTRACT

Systems and methods for creating a collaborative video campaign. The method comprises receiving, at a server, a plurality of videos from remote contributor image capture devices, then sorting the plurality of videos at the server into separate categories, each corresponding to a shot type. Then, the method may comprise displaying, on a page of an edit creation interface of a computing device, representative images of at least some of the plurality of videos within a plurality of sections, wherein the plurality of sections on the edit creation interface comprise: a first section for at least one of the plurality of videos to be reviewed; and a second section at least one of the plurality of videos that have been selected; and providing a selection tool associated with each representative image that allows a user to select the associated video as suitable for inclusion in the campaign.

20 Claims, 23 Drawing Sheets

(56) References Cited

U.S. PATENT DOCUMENTS

| | | | |
|---|---|---|---|
| 7,860,389 | B2 | 12/2010 | Hara et al. |
| 8,553,941 | B2 | 10/2013 | Gabay |
| 9,584,874 | B1* | 2/2017 | Farias .............. H04N 21/25883 |
| 2003/0004791 | A1* | 1/2003 | Kojima ................. G06Q 30/02 705/12 |
| 2005/0007468 | A1 | 1/2005 | Stavely et al. |
| 2010/0146042 | A1* | 6/2010 | Kruhoeffer ............ G06Q 30/02 709/203 |
| 2013/0222299 | A1* | 8/2013 | Heo ...................... G06F 3/0412 345/173 |
| 2014/0059536 | A1 | 2/2014 | Hiratsuka et al. |
| 2014/0222775 | A1* | 8/2014 | Zohar .................. G06F 16/735 707/709 |
| 2016/0078139 | A1 | 3/2016 | Clinton |
| 2017/0223419 | A1* | 8/2017 | Nassie ............. H04N 21/47205 |
| 2018/0041401 | A1* | 2/2018 | Hugman ................ H04L 41/22 |

OTHER PUBLICATIONS

Otero, Vanessa L., "Response to United States Office Action Re U.S. Appl. No. 15/364,258", dated Apr. 19, 2017, p. 14, Published in: US.

Dillet, Romain, "And the Winner of Startup Battlefield at Disrupt London 2016 is . . . Seenit", Retrieved from https://techcrunch.com/2016/12/06/seenit-wins-startup-battlefield-disrupt-london-2016/, Known to exist as early as Dec. 5, 2016, p. 6.

Kumparak, Greg, "Seenit Turns Your Company's Community Into a Film Crew", Retrieved from https://techcrunch.com/2016/12/05/seenit-turns-your-companys-community-into-a-film-crew/, Known to exist as early as Dec. 5, 2016, p. 7.

Seenit, "Transforming Your Consumer Into Your Film Crew", Retrieved from https://seenit.io/, Known to exist as early as Dec. 5, 2016, p. 6.

Looplio, "What Do You Need to Create?", Retrieved from https://www.looplio.com/, Known to exist as early as Nov. 15, 2017, p. 5.

* cited by examiner

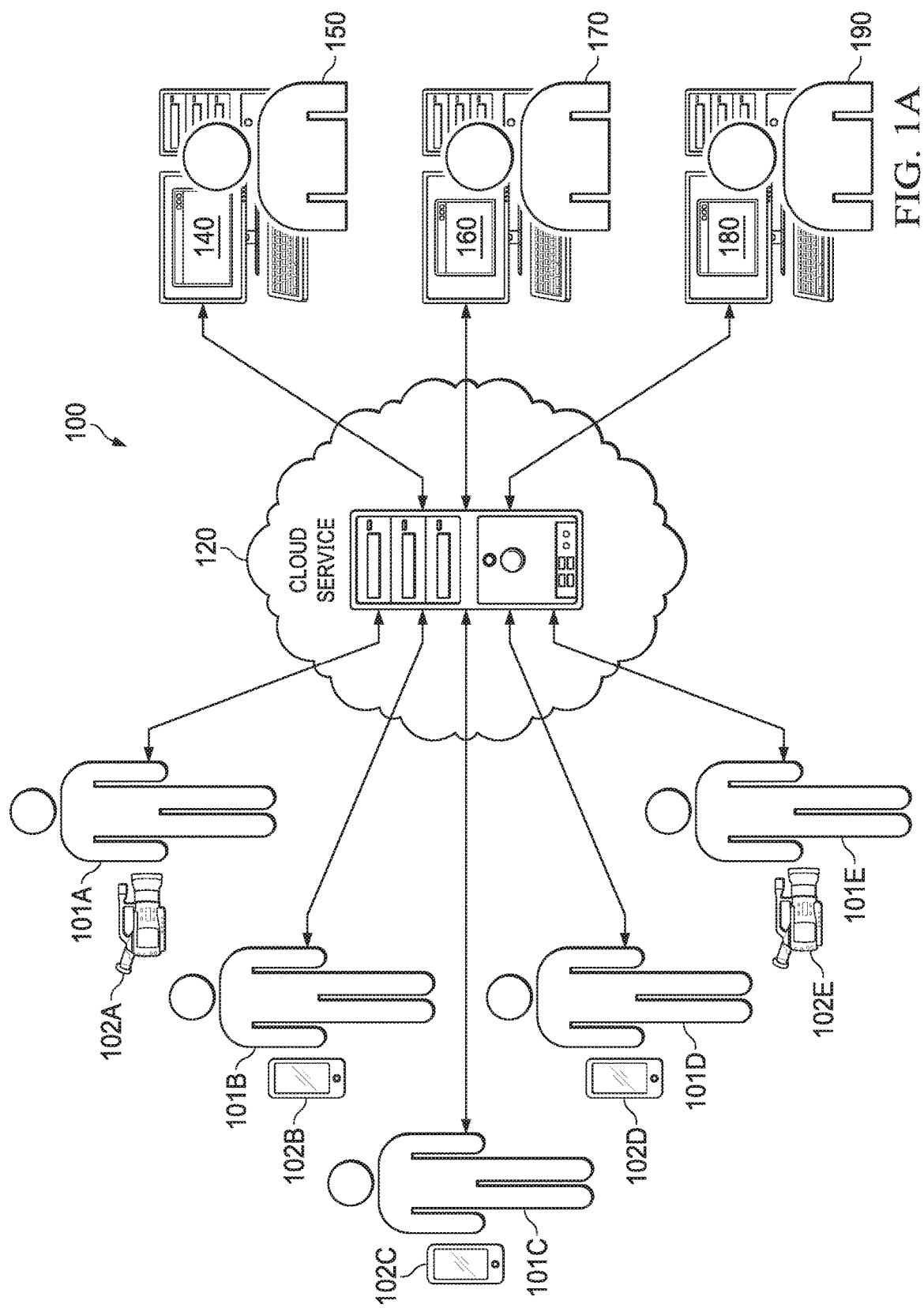

DASHBOARD  MY TEAM  CAMPAIGNS 0.03TB / 1.00TB (3.09%)

Fit  Run Club

910 — ⓒ Notify Team

USERS  INVITES

Team Users

901
🔍 Search by name...

| 901 Name ▼ | Date Added | 903 Latest Upload ▼ | 904 Type ▼ | 905 Remove |
|---|---|---|---|---|
| Pro User 1 | 07/27/2016 | 07/14/2016 | contributor | X |
| Pro User 2 | 07/13/2016 | 07/13/2016 | admin | X |
| Pro User 3 | 07/30/2016 | 07/20/2016 | pro | X |
| Pro User 4 | No Uploads | 05/31/2016 | admin | X |
| Pro User 5 | No Uploads | 06/10/2016 | admin | X |
| Pro User 6 | No Uploads | 07/15/2016 | admin | X |

EDITING INTERFACE FOR VIDEO COLLABORATION CAMPAIGNS

PRIORITY

This application is a continuation of U.S. patent application Ser. No. 15/364,258, filed Nov. 30, 2016 and entitled PHOTO AND VIDEO COLLABORATION PLATFORM, the disclosures of which are incorporated herein by reference in their entireties.

FIELD OF THE DISCLOSURE

The present disclosure relates generally to digital photo and video sharing and editing. In particular, but not by way of limitation, the present disclosure relates to systems, methods, applications, and apparatuses for improving the production, sharing, and editing of photos and videos taken by remote users.

BACKGROUND OF THE DISCLOSURE

High-quality digital cameras for capturing photos and videos have now become ubiquitous due to their incorporation into mobile devices such as smartphones and tablets. As a result, photos and videos are used more and more frequently in an ever-increasing number of applications as a means for people to convey ideas. Social media sites and applications have grown in popularity as platforms for individuals and companies to communicate through photos and videos. Technology improvements in wireless communication, internet speed, processing power, and memory now allow for large photo and video files to be taken and shared across various types of media more easily than ever before.

Businesses and other organizations have long used photo and video advertising campaigns to promote their goods, services, and causes through all kinds of visual media. Now that print and television advertising has been added to, and in some cases, supplanted by internet-based visual advertising, visual content has become central to the growth, recognition, popularity, and success of brands. All forms of visual advertising require the creation of visual content (e.g., photos for still ads and videos for commercials). In many cases, this content is professionally produced, with professional photographers, videographers, and production crew members. It is becoming more commonplace, though, for content may be created by users of a brand. For example, users of Facebook, Twitter, Instagram, and Snapchat can take and post visual content and the tag brands via the brand's user name on the social media site or by searchable brand-related hashtags. Users have the ability to associate both positive and negative images with brands; for example, users can post images of themselves happily using a product, or can post a picture of a defective product along with a complaint. Brands can pay for individuals to purposely create such positive content for the brand (e.g., by sponsoring an athlete who posts a photo or video and tags the brand). Brands can also have users create content organically, by the users' own volition. However, brands have little control over the production quality of content created by individual users, regardless of whether those users are paid or not.

Companies have sought to leverage the power of individual users to enhance their brands. Because so many individuals have high-quality mobile digital cameras, and because so many of these individuals are willing and able to create visual content, opportunities exist for improved systems, methods, applications, and platforms for creating, sharing, and editing such content.

SUMMARY

One aspect of the present disclosure provides a method for creating a collaborative video campaign. The method may comprise receiving, at a server, a plurality of videos uploaded from a plurality of remote contributor image capture devices, and sorting the plurality of videos at the server into a plurality of separate categories, each of the separate categories corresponding to a shot type. The method may further comprise displaying, on a page of an edit creation interface of a computing device, representative images of at least some of the plurality of videos within a plurality of sections, wherein the plurality of sections on the edit creation interface comprise a first section for at least one of the plurality of videos to be reviewed and a second section for at least one of the plurality of videos that have been selected. The method may then comprise providing a selection tool associated with each representative image that allows a user to select the video associated with the representative image as suitable for inclusion in the campaign.

Another aspect of the disclosure provides a platform for creating collaborative video campaigns. The platform may comprise a first application executed at one or more remote contributor image capture devices, the first application configured to capture and upload one or more videos. The platform may further comprise a second application executed at a remote server configured to sort a plurality of videos at the server into a plurality of separate categories, each of the separate categories corresponding to a shot type. The platform may also comprise a third application executed at a computing device configured to display, on a page of an edit creation interface, representative images of at least some of the plurality of videos within a plurality of sections. The plurality of sections on the edit creation interface may themselves comprise a first section for at least one of the plurality of videos to be reviewed and a second section for at least one of the plurality of videos that have been selected. The third application may further be configured to provide a selection tool associated with each representative image that allows a user to select the video associated with the representative image as suitable for inclusion in the campaign.

Yet another aspect of the disclosure provides a non-transitory, tangible, computer readable storage medium, encoded with processor readable instructions to perform a method for creating a collaborative video campaign. The method may comprise receiving, at a server, a plurality of videos uploaded from a plurality of remote contributor image capture devices, and sorting the plurality of videos at the server into a plurality of separate categories, each of the separate categories corresponding to a shot type. The method may further comprise displaying, on a page of an edit creation interface of a computing device, representative images of at least some of the plurality of videos within a plurality of sections, wherein the plurality of sections on the edit creation interface comprise a first section for at least one of the plurality of videos to be reviewed and a second section for at least one of the plurality of videos that have been selected. The method may then comprise providing a selection tool associated with each representative image that allows a user to select the video associated with the representative image as suitable for inclusion in the campaign.

BRIEF DESCRIPTION OF THE DRAWINGS

FIG. 1A is a high-level diagram of the system of the present disclosure comprising image capture devices, a cloud service, and computing devices presenting web interfaces.

FIG. 6 is an exemplary screenshot of a web interface of the present disclosure depicting a campaign overview.

FIG. 9 is an exemplary screenshot of a web interface of the present disclosure depicting information for multiple contributing users to a campaign.

FIG. 10 is an exemplary screenshot of a web interface of the present disclosure depicting an individual user profile.

FIG. 17 is an exemplary screenshot of a web interface depicting entry screens for shot specifications of a shot template.

DETAILED DESCRIPTION

Figure 1B:
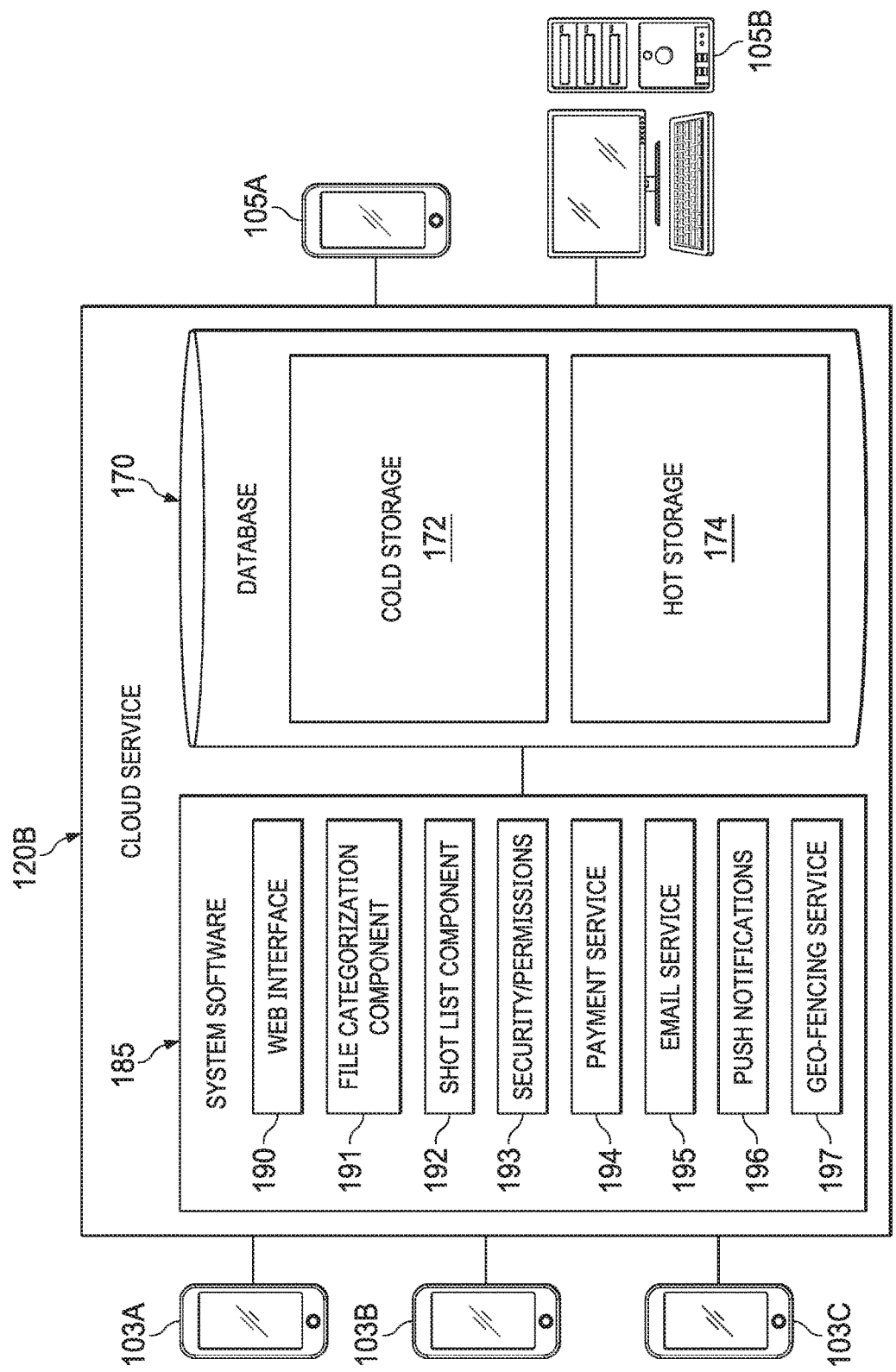
FIG. 1B is a logical block diagram depicting components of an embodiment of the cloud service.

FIG. 1A shows a high-level diagram of a digital media collaboration platform system 100 of the present disclosure. A number of individual users 101A-101E are shown with digital media capturing devices, which are depicted as video cameras 102A and 102E, and smartphones 102B, 102C, and 102D. Any device that is configured to capture digital images and upload them via a network connection may be used in accordance with the present disclosure. Such devices include, but are not limited to, smartphones, tablet computers, standalone digital cameras, desktop computers, laptop computers, and wearable devices. Such devices may be referred to throughout the disclosure as "image capture devices" or simply "cameras," even if they are implemented by devices having additional functionality. The term "digital media" may be used throughout the disclosure to refer to photos, videos, and/or audio recordings, and may be used synonymously with the terms "footage" and "raw footage." An aspect of the disclosure provides a software application that is executable on the image capture device. In some embodiments, the software application may be downloadable and implemented as a mobile phone "app" that is available in commercial app stores such as Apple® Inc.'s App Store and Android's® Google Play. In such embodiments, the software application may have additional functionality through a touchscreen user interface. Embodiments of the application may include the applications described in co-owned and co-pending U.S. application Ser. No. 15/189,964, filed Jun. 22, 2016, which is incorporated by reference herein in its entirety. Other embodiments of the downloadable version of the software application ("mobile app") will also be described throughout the disclosure in greater detail. In other embodiments, the software application may be embedded in an image capture device such as a camera without a touchscreen user interface, or may be available as a web-based (Software-as-a-service) application.

FIG. 1A also shows a cloud-based server 120, which hosts a software application and one or more databases in memory for implementing several features of the present disclosure. For the purposes of clarity in distinguishing between the mobile app implemented on the image capture devices and the software application and databases implemented on the cloud service 120, the software applications, storage, and databases on the cloud server may be referred to simply as the "cloud app," "cloud interface, "cloud database," "cloud server," or "cloud." In implementation, the cloud service 120 may comprise more than one individual software application. The system also includes one or more web interfaces 140, 160, and 180 ("web application" or "web app") that may be accessed through computing devices. Three versions of web applications 140, 160, 180 are shown along with three types of users 150, 170, 190 respectively. Although the web applications 140, 160, and 180 are shown as three separate types of web applications, they may be implemented as a single web application available on the cloud service 120 that has different permissions or access levels for different types of users. A first type of web application 140 may be accessed by a "curator" user 150. A second version of the web application 160 may be accessed by an "administrator" user 170. A third version of the web application 180 may be accessed by an "contributor" user. Each user role described in the system 100 will be described in greater detail later in the disclosure. Although the computing devices are depicted as desktop computers in FIG. 1, the web interfaces 140, 160, 180 may be accessed through any computing device, including, in some embodiments, a mobile device. The versions web interfaces 140, 160, and 160 may generally represent versions of a common web application and comprise a platform for a business or other organization to initiate, manage, and direct a digital media campaign, the content of which may be captured by a plurality of individual remote users. The web applications may comprise additional functionality for sharing, saving, directing, producing, and editing of content, which will be described in greater detail throughout the disclosure.

As a general overview, the system 100 may allow "contributor" users 101A-101E to capture photos and videos on their cameras 102A-102E and, when an appropriate mode or permission is activated or set within the mobile app, automatically upload them to the cloud service 120. Once uploaded to the cloud service 120, the web apps 140, 160, 180 may be used to view, edit, organize, and share the digital media from each of the users 101A-101E. The various users of the system 100 may be categorized according to defined roles. For purposes of the present disclosure, users of the image capture devices whose primary role is to take and upload photos and videos may be referred to as "contributors." Users of the web app whose primary role is to download and edit photos and videos may be referred to as "curators." An additional type of user having an administrative role and who may also use the web app may be referred to as an "admin." The particular names "contributor," "curator," and "admin" are somewhat arbitrary and used in this disclosure simply for the purpose of distinguishing between distinct user roles. Other systems in accordance with the disclosure may utilize other names for these user roles. The scope of the roles of each of the contributors, curators, and admins will be discussed in further detail throughout the disclosure. Referring back to the system 100, a curator 150 using the web app 140 may communicate instructions or directions regarding the photos and videos to the contributors 101A-101E. Bi-directional communication arrows between the image capture devices 102A-102E, the cloud server 120, and the web interface 140 are shown to indicate that photos, videos, and messages may travel back and forth between the interfaces and devices comprising the system 100.

FIG. 1B is a logical block diagram depicting components of the cloud server 120 described in FIG. 1A in further detail. Cloud service 120B may comprise system software 185 and a database 170. Similar to FIG. 1A, the cloud service 120B is shown being in communication with a plurality of image capture devices 103A-C and in communication with computing devices 105A and 105B, which are configured to execute the web interface.

The system software 185 may comprise a number of individual software programs, services, and/or APIs, which may be separate or integrated in implementation. The system software 185 may comprise a web interface component 190 which will be described in detail throughout this disclosure with reference to screenshots of the web interface itself. The system software may also comprise a file categorization component 191 for sorting and managing digital media files uploaded to the cloud service 120B. The categorization component 191 may interface with the database 170, which may store the digital media files. It is contemplated that large amounts of digital storage will be used in implementations of the disclosure. The database 170 may comprise "hot" storage 174, which stores digital media files most likely to be retrieved during a period of time, and "cold" storage 172, which may store files less likely to be retrieved.

Turning back to the system software 185, it may also comprise a shot list software component 192. The shot list features and functionality will be described later in the disclosure. The system software 185 may further comprise a security and permissions component 193, a payment service 194, an e-mail service 195, a push notifications component 196, and a geo-fencing service 197, each of which may implement aspects of the disclosure described herein.

Figure 1C:
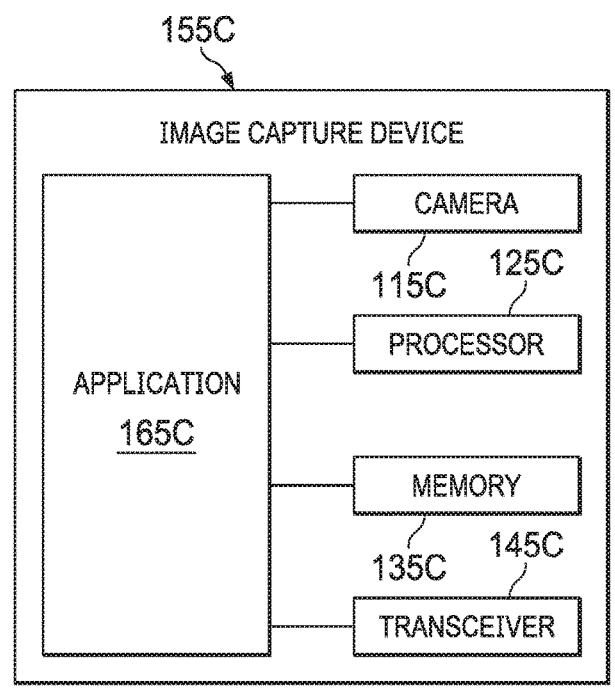
FIG. 1C is a logical block diagram depicting components of an image capture device that may be used to implement aspects of the present disclosure.

FIG. 1C is a logical block diagram of an image capture device 155C that may be used to implement aspects of the present disclosure. As shown, the image capture device 155C executes an application 165C, via a processor 125C and a memory 135C. The application may directly interact with various components of the image capture device 155C, namely, the camera 115C for all camera functionality, and the transceiver 145C for automatically uploading digital media to the cloud service.

Figure 2:
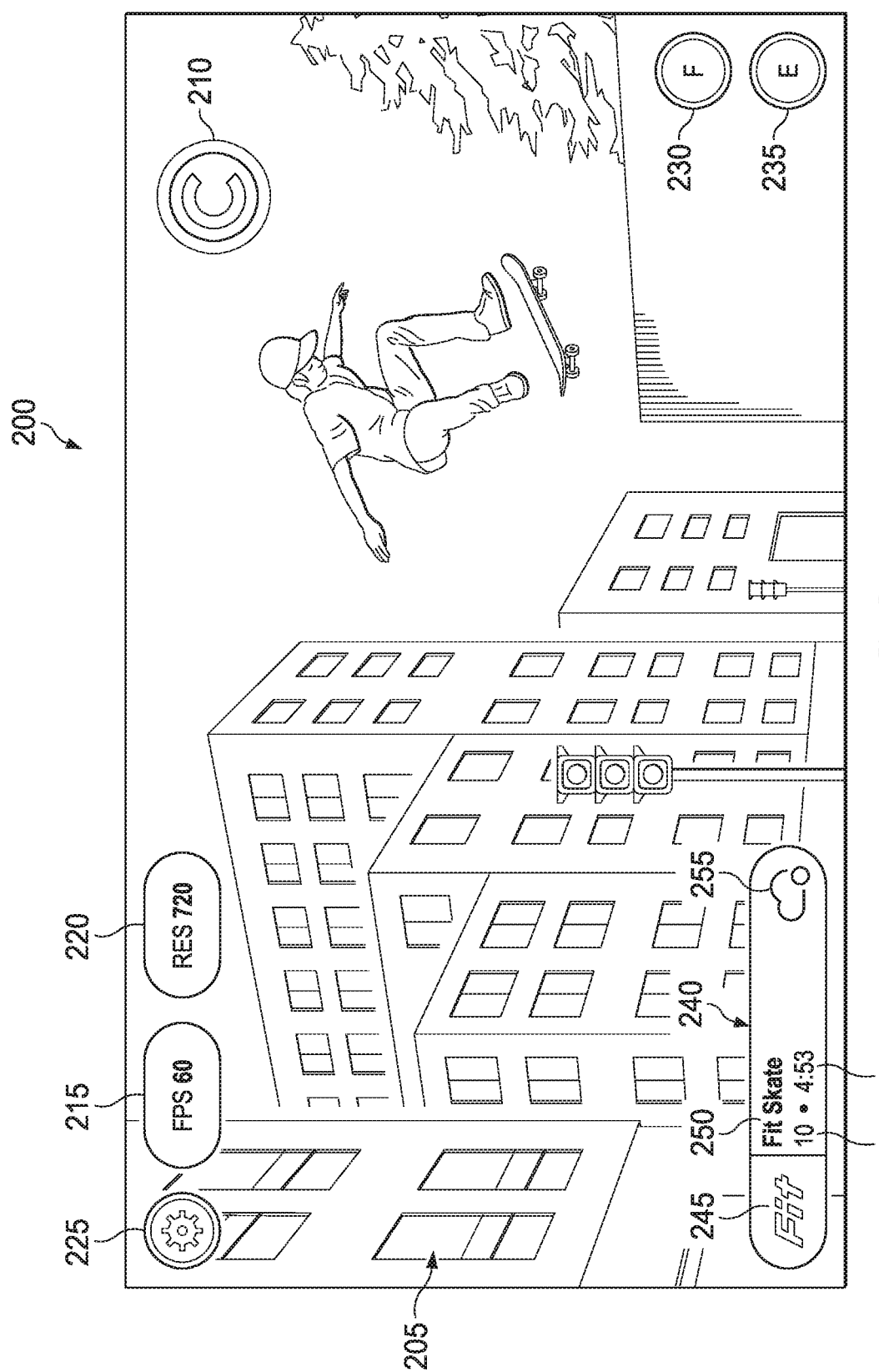
FIG. 2 is an exemplary screenshot depicting image capture and uploading features of a downloadable software application for an image capture device.

The features and functionality of the system of the present disclosure may be best understood through describing screenshots of the mobile app and web interface. Turning to FIG. 2, shown is a screenshot of the mobile app 200 in a recoding mode. In the embodiment shown, the digital media being captured (in this case, a video 205), is displayed on nearly an entire touchscreen of an image capture device. Several touchscreen functional buttons are superimposed upon the video 205. A record button 210 for beginning and ending recording is shown in the top right corner of the screenshot. The placement and configuration of the functional buttons shown in the present embodiment are exemplary only, and may appear differently in other embodiments. The differences in appearance and placement may depend on a number of factors, including the type of device on which the digital media is being captured or the nature or type of digital media itself being captured. For example, though the recording button 210 is shown on the screen itself, some devices may have external buttons that can be pressed to take photos or to stop and start recordings. It is contemplated that certain cases for mobile devices that are shaped like cameras and have external camera buttons for camera functionality may be used to record digital media with the mobile app of the present disclosure. Examples of these camera-shaped cases for mobile devices include the ones shown and described in commonly owned and co-pending U.S. application Ser. No. 15/189,964, filed Jun. 22, 2016, and previously incorporated by reference herein.

The mobile app 200 may also include technical information displays about the present recording of digital media, such as an "FPS" (frames per second) display 215 and a "RES" (resolution) display 220. In many existing smartphones, camera settings such as frames per second and resolution can be changed through a settings menu. An aspect of the mobile app 200 is that it may interface with the camera of the device or the settings menu directly, and allow the user to change the FPS and resolution through the FPS display 215 and RES display 220 via the touchscreen interface of the app. That is, a user would not have to exit the mobile app in order to change the FPS or resolution; the mobile app could do it automatically.

The mobile app 220 may also display one or more settings menus such as settings menu 225. The settings menu 225 may allow the user to access options such as Frequently Asked Questions (FAQ), send a ticket for administrative support, and to log into a user account Other functional buttons on the mobile app 200 may include a focus button 230 and an exposure button 235. These buttons may allow a user to manually focus and manually adjust the exposure through, for example, a touchscreen interface. The focus and exposure controls on the touchscreen interface may control the camera of the mobile device. Additional features available but not visible on the touchscreen interface include zoom in and zoom out capabilities.

A mobile dashboard 240 is shown in the bottom left corner or the mobile app 200. The mobile dashboard 240 may comprise a synchronization icon ("sync icon") 255. In FIG. 2, the sync icon 255 is shown as a cloud with an empty circle to indicate that the digital media being captured is in the process of being uploaded to the cloud server. The sync icon 255 may also change the appearance of its display to reflect different modes. For example, the empty circle may be changed to a whole green circle to indicate that the digital media has been successfully uploaded, or to a red circle to indicate that an attempted upload was unsuccessful. The sync icon 255 may appear in a variety of different ways to indicate 1) uploading in progress, 2) successful uploading, and 3) unsuccessful uploading; the embodiments described are exemplary only. The mobile dashboard 240 may also show other information, such as a logo 245 associated with a campaign, a campaign name 250, a number of shots taken 260, and an elapsed time 265 of a video. The functions of the information on mobile dashboard 240 will become apparent as campaigns are discussed in the disclosure. In some embodiments, the mobile dashboard 265 may include some or all of the functionality available in a dashboard as described in FIG. 3 et. seq.

Figure 3:
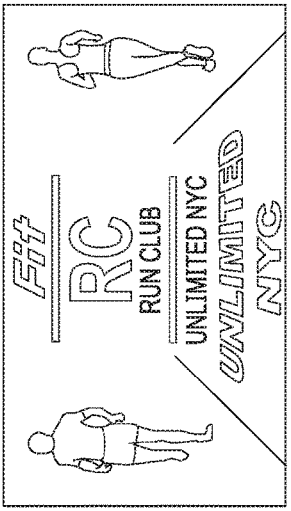
FIG. 3 is an exemplary screenshot of a web interface of the present disclosure depicting a campaign brief.

Turning now to FIG. 3, shown is a dashboard 300 as would be visible to a user of the system. Throughout the disclosure, the terms "dashboard" and "web interface" may be used somewhat interchangeably. Each type of user (e.g., contributor, curator, and admin) may have access to a dashboard such as the dashboard 300 shown, but each of the types of users may have different levels of permissions and access to features on the dashboard. The views shown in the following figures include all available features and generally represents a view available to an admin user. However, various user roles may be referenced in relation to different features. The dashboard 300 may be used to implement aspects of a campaign that receives digital media contributions from user (i.e., contributors) using embodiments of the mobile app 200 shown in FIG. 2. Shown at the top of the dashboard 300 is a title 301 of a campaign. A campaign may be considered a project or a way of categorizing of a set of digital media created for a particular purpose identified by the creator of a campaign. It is contemplated that the platform of the present disclosure may be used to implement a multitude of types of campaigns. A campaign may be implemented by an individual or an organization such as a company, a brand, a governmental body, a non-profit organization, a group hosting an event, a school, or a team, for example. The following list of campaigns examples reflect a few of the many possibilities available by implementing aspects of the present disclosure.

a. A campaign may revolve around the production of a particular advertisement or set of advertisements. For example, a company that sells shoes and athletic gear could set up a campaign in order to gather photos and videos of athletes wearing the company's shoes and gear during an athletic event.

b. A campaign may revolve around a particular event for the purposes of promoting future similar events or creating a record of a completed event. For example, a concert or convention organizer may create a campaign in order to gather particular shots of the crowd, the venue, and the speakers or performers. The types of events around which campaigns may be organized include games (e.g., baseball, basketball, soccer), races (e.g., marathons, swim meets, obstacle courses), athletic competitions (e.g., gymnastics meets, weightlifting competitions, fights), political rallies, company meetings, trade shows, fundraisers, recitals, or plays.

c. A campaign may revolve around a time period for an organization's ongoing activities. For example, a company may have security cameras that automatically capture and upload video on an ongoing basis, and campaigns can be used to organize regularly collected footage into blocks of hours, days, weeks, or whatever other period of time may be appropriate. Security footage may be automatically categorized within a campaign based on criteria such as motion detection. The categorization of digital media within a campaign will be described in more detail throughout the disclosure. As another example, a police department using body cameras and dashboard cameras could set up campaigns to organize automatically uploaded video by time period and by officer or vehicle.

d. A campaign may revolve around locations for the purposes of promoting ongoing activities at that particular location on social media. For example, campaigns can be organized at a skate park, rec center, gym, dog park, tourist destination, performance venue, restaurant, mall, hotel, church, bar, nightclub, or any place of business. As just one example of an ongoing campaign at a skate park, a skating gear company could designate a number of skating enthusiasts who regularly frequent a particular park as campaign contributors. The campaign may be used to gather digital media captured by the users in order to regularly post images congruent with the skating company's brand on its social media accounts.

It is contemplated that campaigns may be organized around one or more of the above-mentioned categories of campaigns, as will become apparent in describing the figures illustrating the campaign dashboard 300. The campaign dashboard 300 shows a campaign for an athletic gear and shoe company. The campaign title 301 is "Unlimited NYC 8 13 2016," which indicates a particular name or an ad campaign ("Unlimited"), a location ("NYC", i.e. New York City), and a date (Aug. 13, 2016). The particular campaign is therefore organized around a particular event, a brand, a location, and a date. The dashboard 300 in this example is shown as it would be set up for a curator from the athletic gear and shoe company, and is customized with the company's logo 302 in the top right corner. The dashboard 310 is also customized with a campaign image 310, which may allow a curator to quickly visually identify a particular campaign. It is contemplated that one curator may manage multiple campaigns. Dashboards for different curators may be customized accordingly.

Just below the campaign title 301 is a menu of three tabs: a "Brief" tab 300, an "Edits" tab 304, and a "Footage" tab 305. Each will be described in detail in this disclosure. In FIG. 3, the Brief tab 303 is displayed. A campaign brief may be thought of as a document outlining the creative direction of the campaign. The campaign brief 315 shows a name of an event—Unlimited NYC—which in this case is a meeting of a running club. The campaign brief 315 also has a Tone, which is described as "upbeat, fun, exciting, and social." Finally, the campaign brief 315 includes Shooting Tips 320, which in this case instruct the contributors to "shoot in Res 1080." At the bottom of the screen, a "Campaign Tags" option 330 is displayed. Campaigns may comprise one or more "tags" that may be used to associate captured digital media with a description for the purposes of categorization. Users, including contributors, admins, and curators, may be able to associate tags with digital media at various times and from either the image capture devices themselves or the web interface. These tags may be added as metadata to digital files and may be used to organize or retrieve the digital media. Shown is a tag 335 named "runclubny."

Figure 4:
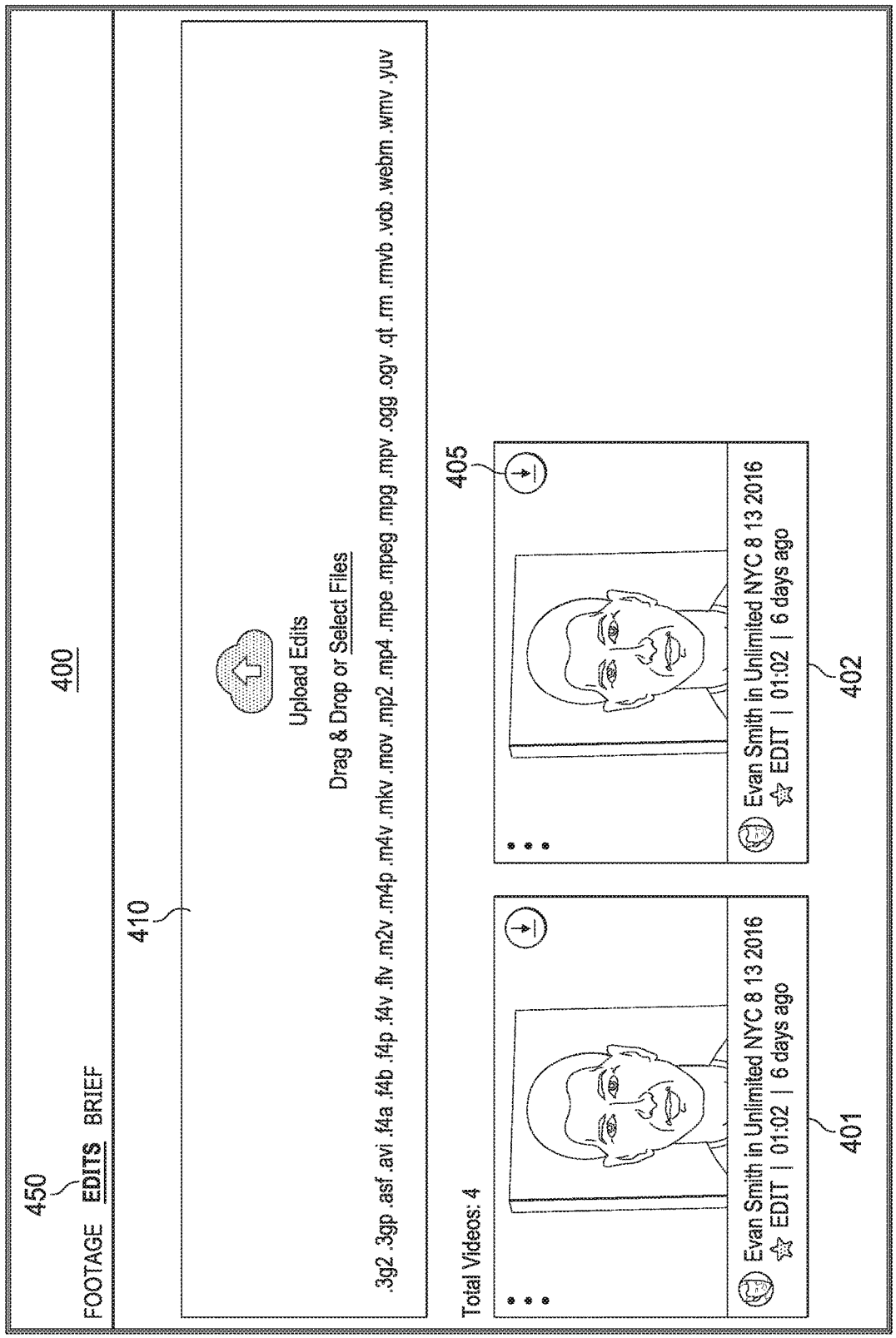
FIG. 4 is an exemplary screenshot of a web interface of the present disclosure depicting editing and uploading functions.

FIG. 4 shows an "edits" tab 450 of the dashboard 400. An aspect of the system is that once footage is uploaded to cloud and is made visible on a dashboard, curators, admins, or other users may then edit the footage. The dashboard 400 may represent a dashboard with features that are available to a curator, and will be described as a "curator's dashboard." However, the other types of users that have editing capabilities may also have the same view and functionality. The process of editing footage may comprise any kind of photo or video editing tools and functions known in the art, such as changing visual qualities of the photo or video, adding or removing sound, removing portions of video, and creating a compilation of multiple different photo or video files. The dashboard 400 may allow a user making edits (an "editor") to download footage onto a local computer in order to make edits on a robust photo or video editing program executed on the local computer. In some embodiments, photo and video editing capabilities may be built in to the dashboard itself (i.e., as part of the web application interface.) Certain automatic editing systems and methods will be described in detail later in this disclosure. Only users (e.g., curators, admins) that have editing permissions may have this view of a dashboard 400. The dashboard 400 shows two videos 401 and 402, which are files of edited digital media that have been created (e.g., by a curator, admin, or editing service provider) and are available to the user of the dashboard 400 for downloading. Throughout this disclosure, digital media files that have been edited may themselves be referred to as "edits." As shown, each of the edits 401 and 402 have a download icon 405 that, when clicked, would allow the user of the dashboard 400 to download the edit from the cloud app and database. The edits 401 and 402 shown are thumbnail representations of files of the edits that are actually stored in the cloud database. Thumbnails may be shown because the volume of data of all the edits of a particular campaign may be extremely large and impractical to transmit to, or store at, each local computing device of a user. Instead, completed edits may be stored at the cloud database and may be downloaded by the various users of a particular campaign as needed.

The edits tab 450 of the dashboard 400 also has an uploading section 410. When a user clicks on the uploading section, a window may open to allow the user to select local files of edited footage. When a user actually uploads these locally-created edits, they will be transmitted and stored at the cloud database and will be visible as thumbnails to other users with editing permissions on their dashboards. Any users that have permission to download edits from their dashboards may download completed edits onto their local devices, from which they may use the edits for advertising campaigns. For example, campaign creators may post a final edit to a social media account for their organization.

Figure 5:
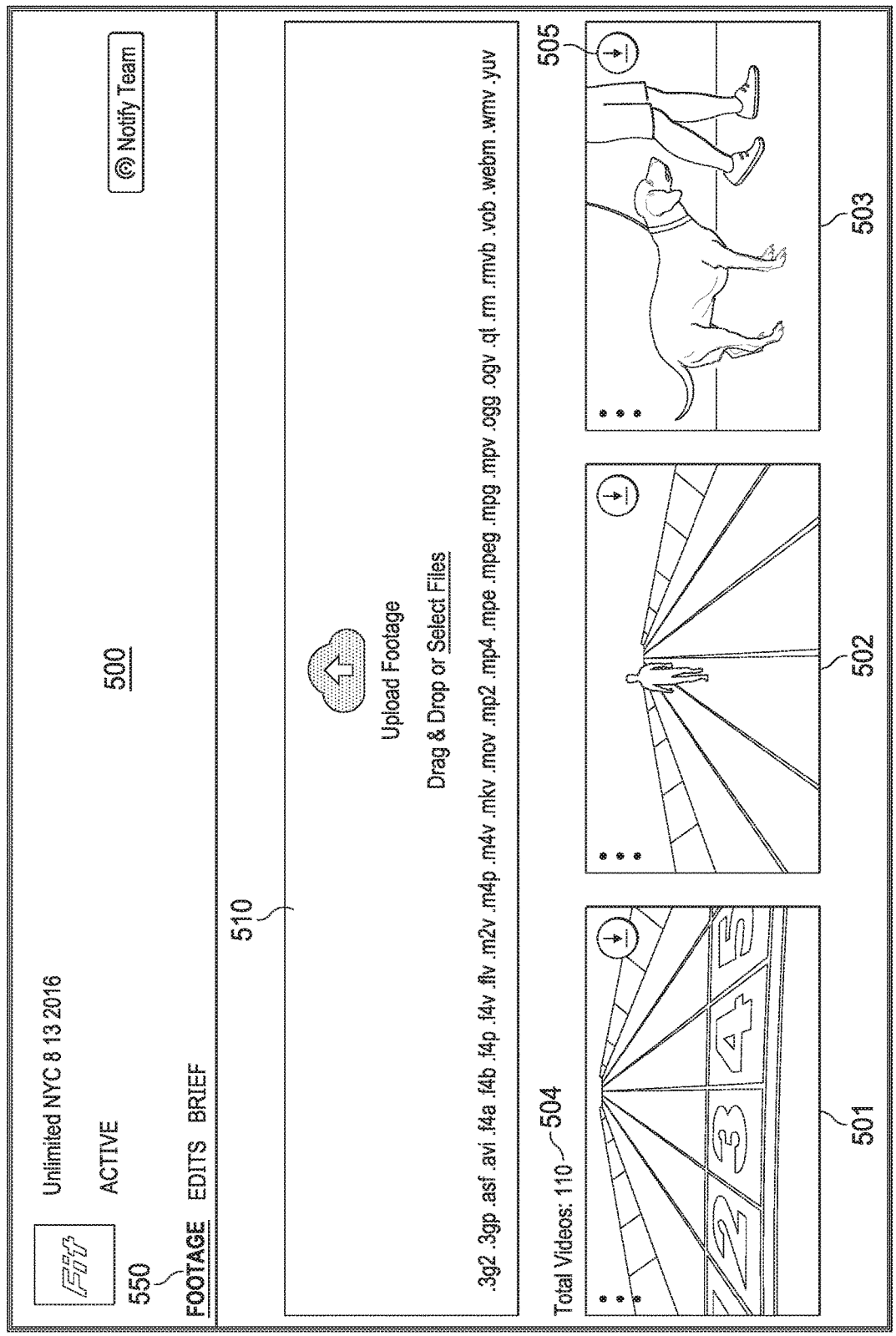
FIG. 5 is an exemplary screenshot of a web interface of the present disclosure depicting footage viewing and uploading functions.

FIG. 5 shows a "footage" tab 550 of the dashboard 500. The footage tab 450 looks similar to the edits tab 450 of FIG. 4, but the thumbnails 501, 502, and 503 shown represent raw footage, captured by contributors of a particular campaign, that is available on the cloud service for download at the curator's local computing device. The thumbnails 501, 502, and 503 may have been automatically uploaded to the cloud app upon being captured by a campaign contributor. A "total" indicator 504 shows that there are 110 total videos that are available to the curator to potentially download for editing. Although only three are visible in the view of FIG. 5, the rest may be viewed by scrolling down on the web page. Similar to the full edits that are available on the edits tab 450 in FIG. 4, each photo or video of raw footage has a download icon 505 to allow the curator to download local footage to edit on the curator's local device. The footage tab 550 also has an uploading section 510. Though the system allows raw footage to be uploaded automatically and remotely by contributors, there are some circumstances in which users may want to upload footage from another source into the campaign. For example, if a user records footage from a video camera that is not equipped with the mobile application of the present disclosure, the user can upload the footage from the camera to a local computer, and then upload the footage from the local computer to the cloud app through the uploading section 510.

Figure 6:
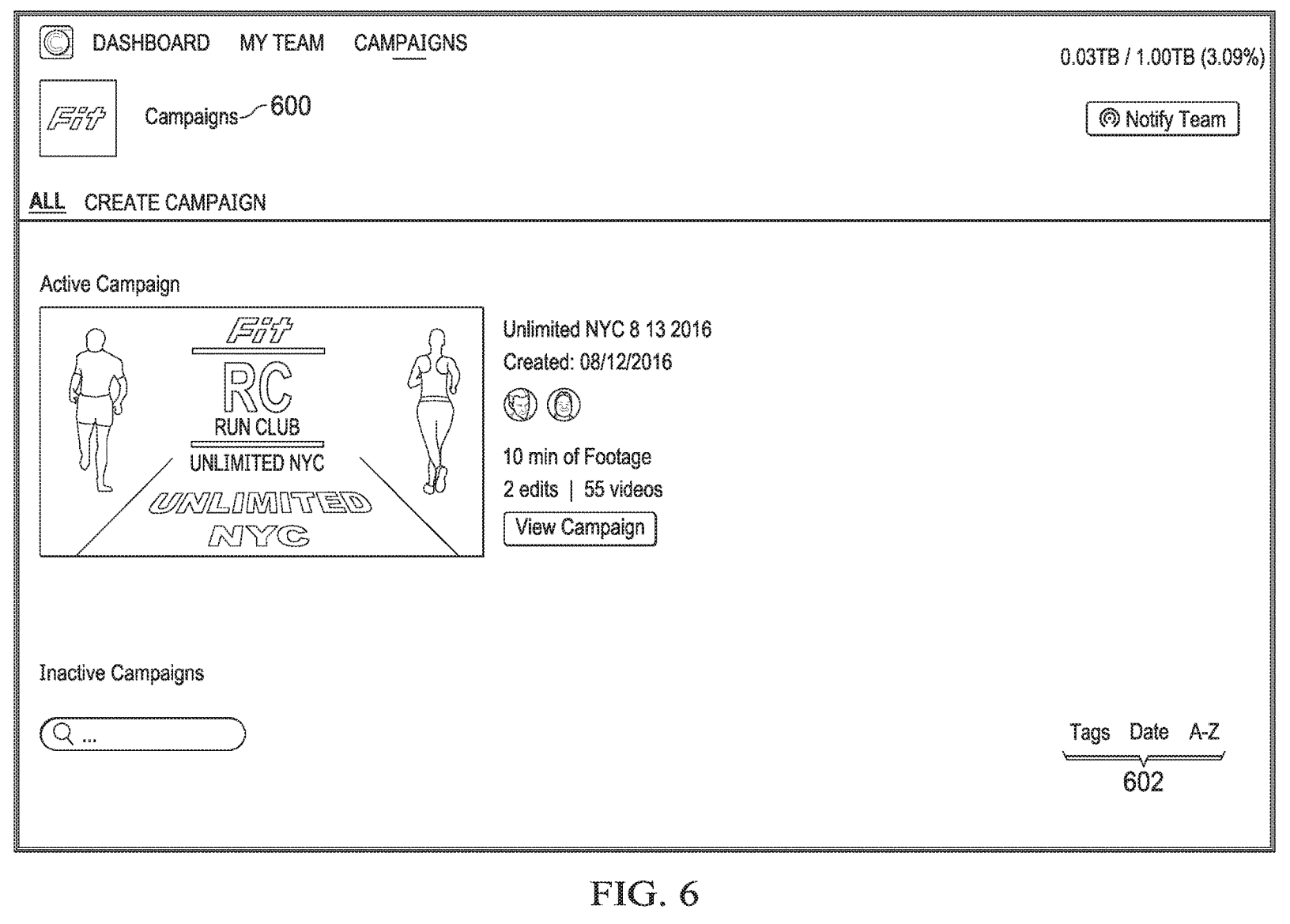
Figure 7:
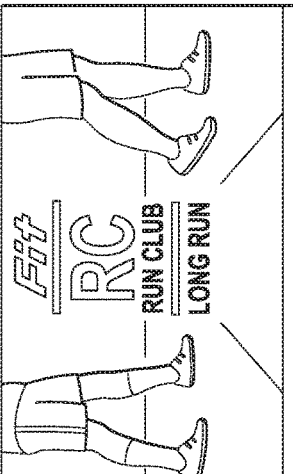
FIG. 7 is an exemplary screenshot of a web interface of the present disclosure depicting a view of past campaigns.

FIG. 6 shows a top portion of a screen of a "campaigns" section 600 of the web application which depicts an overview of "active" and "inactive" campaigns. Active campaigns, as the name indicates, may refer to a campaign which is still actively collecting footage from contributors, and inactive campaigns may be ones that are over or paused for a period of time. The overview of the campaigns may show basic information of a campaign including, for example, the name, a date it was created, the length of total video footage, a number of edits, and a total number of photos and/or videos captured. Over time, an organization may create dozens, hundreds, or more campaigns. The organization may want to find and sort through past campaigns for a number of reasons, including wanting to re-use previously captured footage or previously created edits. The campaigns section 600 may include sorting features 602, which allow a user to sort the view of campaigns by tags, by date, or alphabetically by title, for example. FIG. 7 shows a bottom portion of the campaigns section 600 shown in FIG. 6, with images of several inactive campaign summaries 701-705. Each shows a representative image along with a total number of videos that were collected as part of the campaign.

Figure 8:
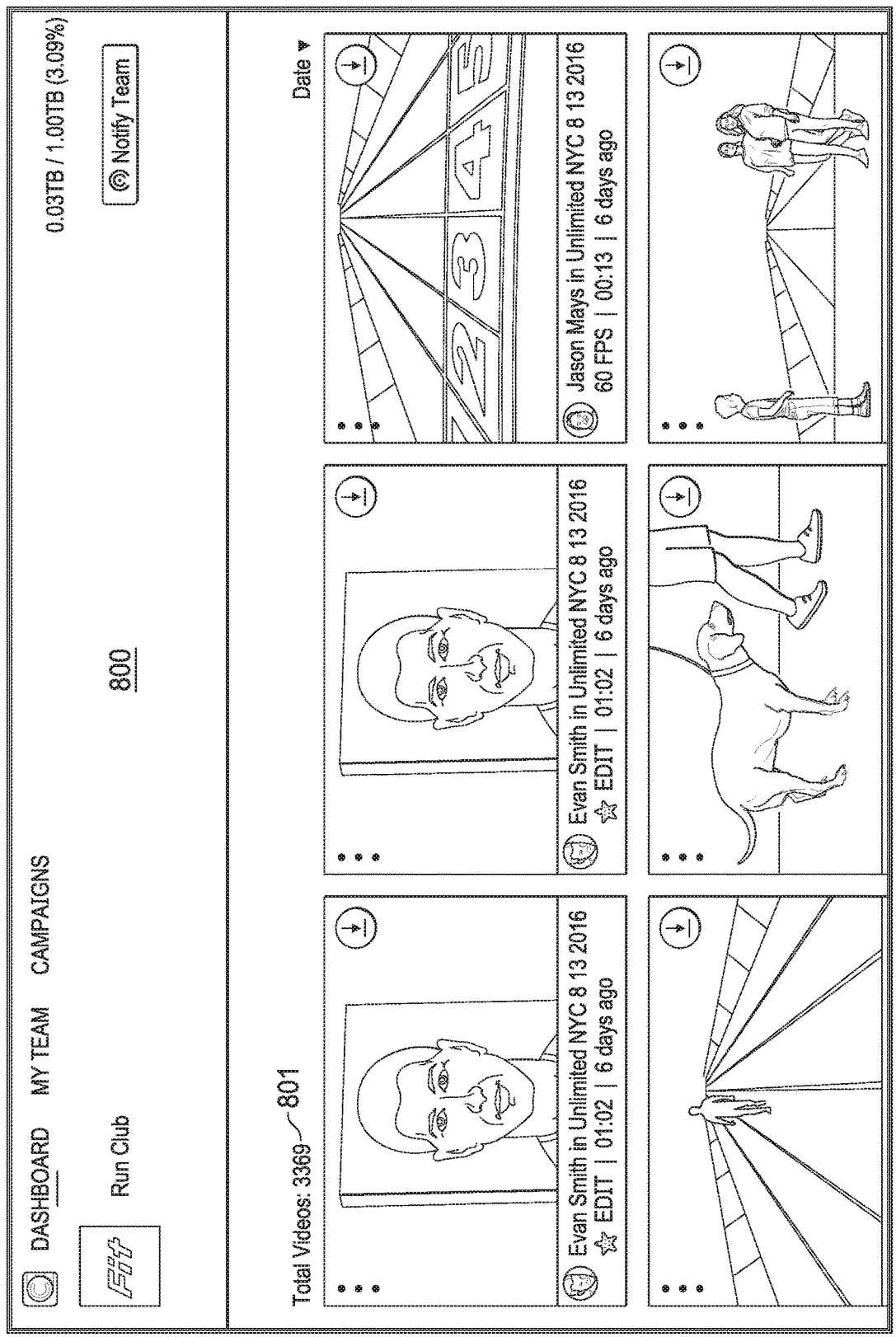
FIG. 8. is an exemplary screenshot of a web interface of the present disclosure depicting edits and raw footage of a campaign.

FIG. 8 shows a view of a dashboard 800 that shows all the digital content collected for a series of related campaigns. Digital content may comprise all the photos and videos collected for the series of related campaigns. In this particular view, a "totals" icon 801 shows a large number of total videos: 3369. It may be difficult to scroll through such a large number of videos, so the dashboard view 800 may include a search bar that allows a user (e.g., a curator) to search by a number of criteria through metadata associated with the digital media files. The searchable criteria may comprise campaign names, campaign tags, subject matter tags, user identification, location, and date, among other types of information.

FIG. 9 shows a view of a "My Team" tab 900, which allows a user (e.g., curator or administrator) to view the other contributors. The particular view shown may be an admin view, through which the user may see who else holds the admin role in this campaign. The My Team tab 900 lists users by name 901, date added 902, latest upload 903, and type (i.e., role) 904. An admin may have the ability to remove users through the remove option 905. Each of the columns 901-904 may allow sorting so the admin can view information about the user in a desired order. For example, an admin may want to view users by last upload date. It may be beneficial for an admin to view the upload frequency and quality of individual users and remove users who don't contribute as frequently or whose footage is not as useful as others. Organizations may have limited resources for managing and editing the large amounts of footage that may easily be collected through a large number of users, so if an admin can identify those users whose footage is especially valuable, effective campaigns can be created more efficiently. For example, though some organizations may use employees as contributors whose job responsibilities include capturing digital media, other organizations may use customers or volunteers (over whom they have limited control) to capture digital media. In organizations that use customers or volunteers, admins can create positive reward or incentive programs to attract and retain the best content creators.

An aspect of the disclosure is that an admin may notify team members about information pertaining to a campaign. The My Team tab 900 has a "Notify Team" button 910, which is also available on other screens. The Notify Team button may be used in a number of ways to send real-time push notifications to team members (contributors, curators, and/or admins). These push notifications may be especially useful when sent to the mobile devices of contributors who are capturing digital media content during an active campaign. Although push notifications are primarily discussed herein, notifications of any sort, including text messages, in-app notifications, push, or pull notifications can be used. These notifications can be used to send any kind of message and may be used to remotely direct the kind and quality of digital media captured. For example, an admin or curator may notice that during the course of a campaign, many still shots or nature shots are being captured by contributors, but not enough action shots of people are being captured. The admin or curator may send a push notification to contributors instructing them to take more action shots. As another example, a curator may realize that they need more slow-motion, or black and white, or faster frame rate shots, and may send out push notifications to that effect. A curator or admin may be able to observe the quality and quantity of digital media being gathered by contributors because they are automatically uploaded in real time from the contributors' image capture device to the cloud. The Notify Team feature 910 may also allow the admin or curator to selectively notify certain users. For example, if the admin viewing all the users on the My Team tab 900 has some contributors on the list that are in New York and others that are in Los Angeles, the admin can selectively notify just the New York contributors who are working on an active campaign in New York. In implementation, an admin may selectively notify users based on nearly any criteria.

Figure 10:
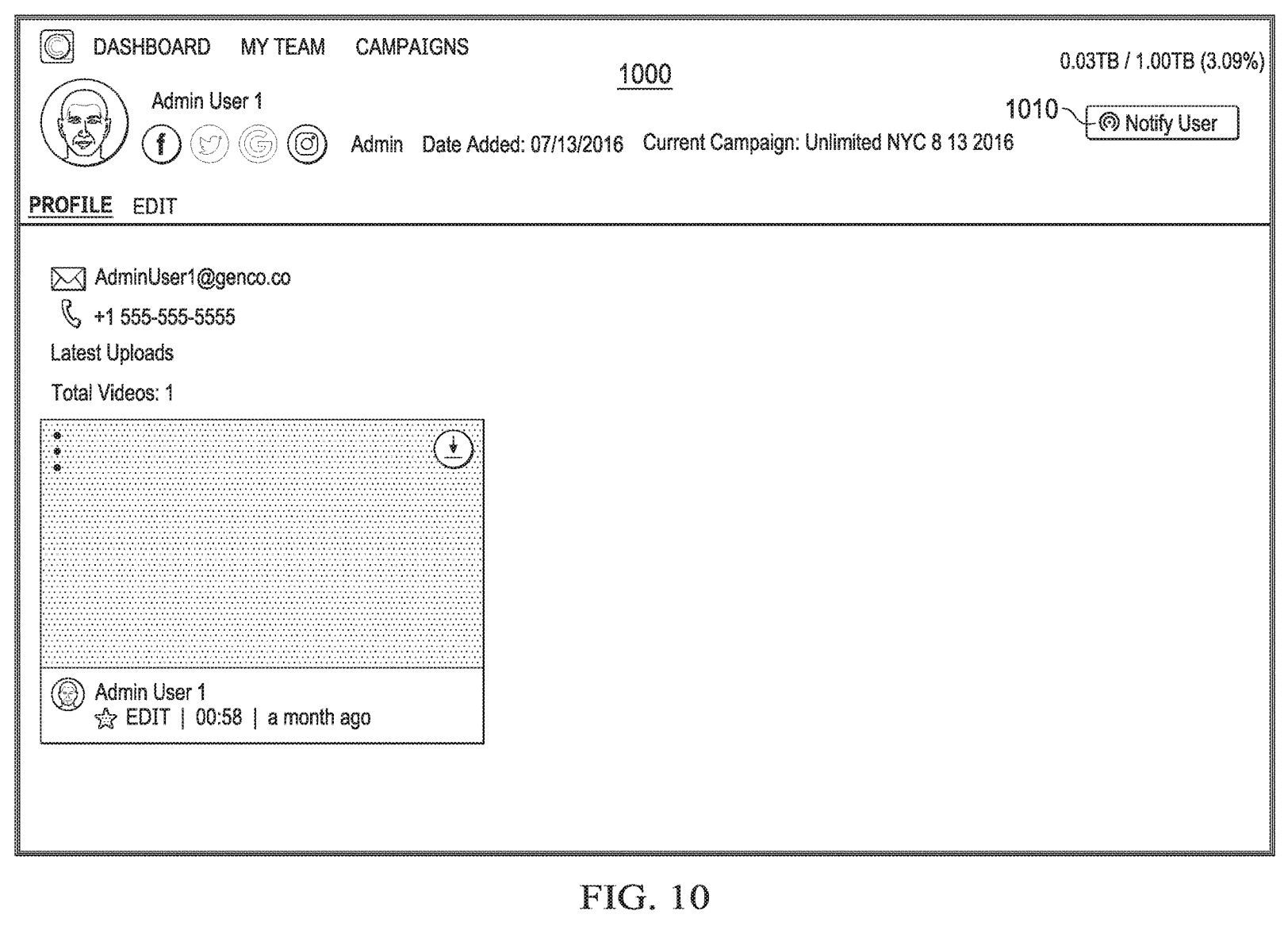

FIG. 10 shows an individual user profile 1000 of an admin. Curators and contributors may have similar individual user profiles. The individual user profile may contain contact information for the user as well as a collection of digital media that the user has captured. This view may be helpful to an admin or curator to determine the quality and quantity of digital media captured by the particular user. The individual user profile may also have a "Notify User" feature 1010, which may be used by an admin or curator to send an individual push notification to the user.

Figure 11:
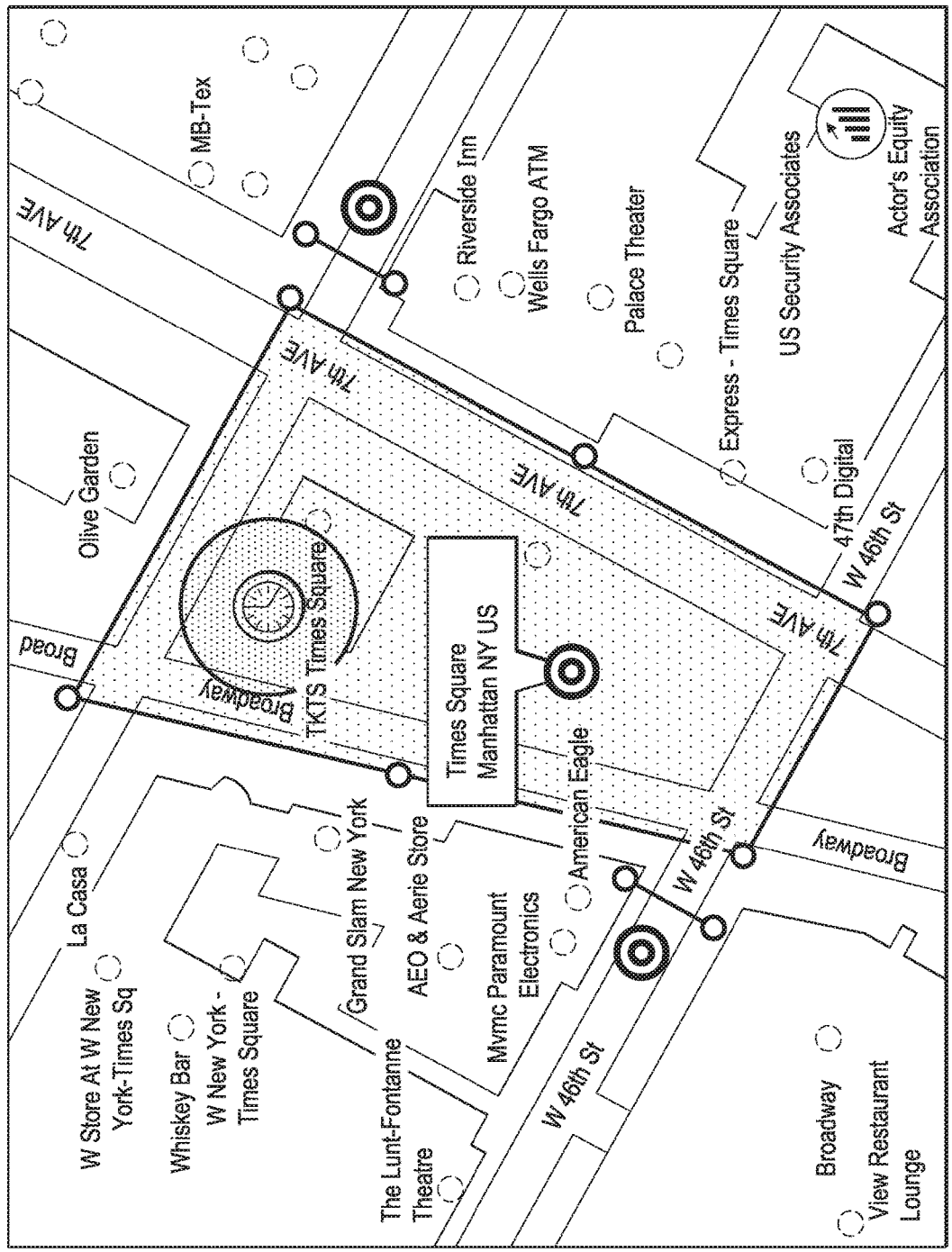
FIG. 11 depicts how geo-fencing features of the system of the present disclosure may be implemented.

Another aspect of the disclosure provides features for automatic campaign creation and execution through a feature referred to herein as "smart campaigns." Smart campaigns may use the systems and methods previously described and automate the set-up and execution of campaigns based on pre-determined criteria. FIG. 11 shows a map 1100 that illustrates aspects of how smart campaigns are set up. The pre-determined criteria may include geolocations, times, or both. For campaigns based on geo-location, for example, an organization can set up a geo-fence around an area of interest. Geo-fencing is known in the art of mobile devices to establish a virtual marker based on a GPS location of a particular mobile device. An application developer can set up a virtual "trip wire" at a geographical location, such that a mobile device that crosses the trip wire will receive a notification. For example, on the map 1100, if a mobile device user crosses the line drawn on $7^{th}$ Ave., the user may receive a notification. Mobile devices today are equipped with highly accurate GPS systems which can transmit exact locations of the devices and their users as soon as they enter a particular geographic area. Many smartphone applications use geo-fencing to send information to a user when the user enters a location specified by the application developer. This information can be sent to a user when the user opens an application, or alternatively, in a push notification. Several aspects of the present disclosure utilize the many pieces of data available about mobile devices and their users that are available to mobile device application developers, such as geolocations, dates, times, demographic data, data usage, and more. These pieces of data may be used in smart campaigns to enhance the type, quality, and quantity of digital media captured by users. The pieces of data may also be used to provide insight about a campaign's contributors to the organization that created the campaign.

Another aspect of the disclosure is that in some embodiments, data associated with digital media may be used to retrieve older, stored digital media from previous campaigns, even if those older digital media files were from several months or years prior. For example, a curator of a current campaign that takes place in a particular geolocation may be able to not only use digital media from the current campaign, but may also look up stored digital media associated with the same geolocation. The geolocation information may exist as metadata of the stored digital media, and the digital media may be stored in and retrieved from the cold storage 172 of FIG. 1B. Any type of metadata that is capable of being collected by a contributor's smartphone and associated with stored digital media may be used to search and retrieve digital media for use in a current, related way. As additional examples, a curator may be able to retrieve digital media associated with days that were snowy, or that were taken between 2:00 and 3:00 pm.

In some implementations of the present disclosure, a particular company may have a predetermined set of curators, administrators, and contributors that regularly conduct campaigns. In such implementations, each of these roles may be filled by employees or associates of the particular company. For example, a company may have one to three administrators, one to three curators, and a slightly larger number of contributors (e.g., 5, 10, or 20). These numbers of users filling each role are exemplary only, and there may, of course, be more or fewer users depending on the size and scope of the organization conducting campaigns, but such examples reflect that in many organizations, there are typically a few more contributors than curators, and the contributors may regularly shoot footage and be accustomed to working with the system of the present disclosure.

In some implementations, organizations may wish to solicit digital media content from a much wider group of people than just their own employees or affiliates, and therefore may not have a set or predetermined number of contributors for a campaign. For example, an organization that owns a sports team may wish to set up a campaign that invites anyone with a mobile device attending a particular game to be able to contribute to a campaign that takes place during the game. In these implementations, a text notification may be sent to any mobile device user who attends the game (once they enter the geo-fenced stadium) that informs the user that he or she may participate in a campaign being run by the event organizers. The text notification may direct the user to download an app that provides further instructions and enables users to begin taking and automatically uploading photos and videos. Alternatively, if a user already has the app, the notification may be sent through the app when the user enters the geo-fenced location and instruct the user to proceed to take particular shots, as will be described presently.

Smart campaigns may be automated in a number of ways. As previously discussed, the campaign time, location, and duration can be set up so that a campaign starts automatically. Another aspect of the campaign may be set up automatically as well, which is the creative direction of the content. This automation of creative direction may be known as and referred to as a "shot list." The automated features may be implemented by the aspects of the system previously described in the disclosure, such as a mobile device software application, a cloud server, and a web interface through. The functionality of the shot list may be best understood through screenshots of the mobile application in FIGS. 12 and 13.

Figure 12:
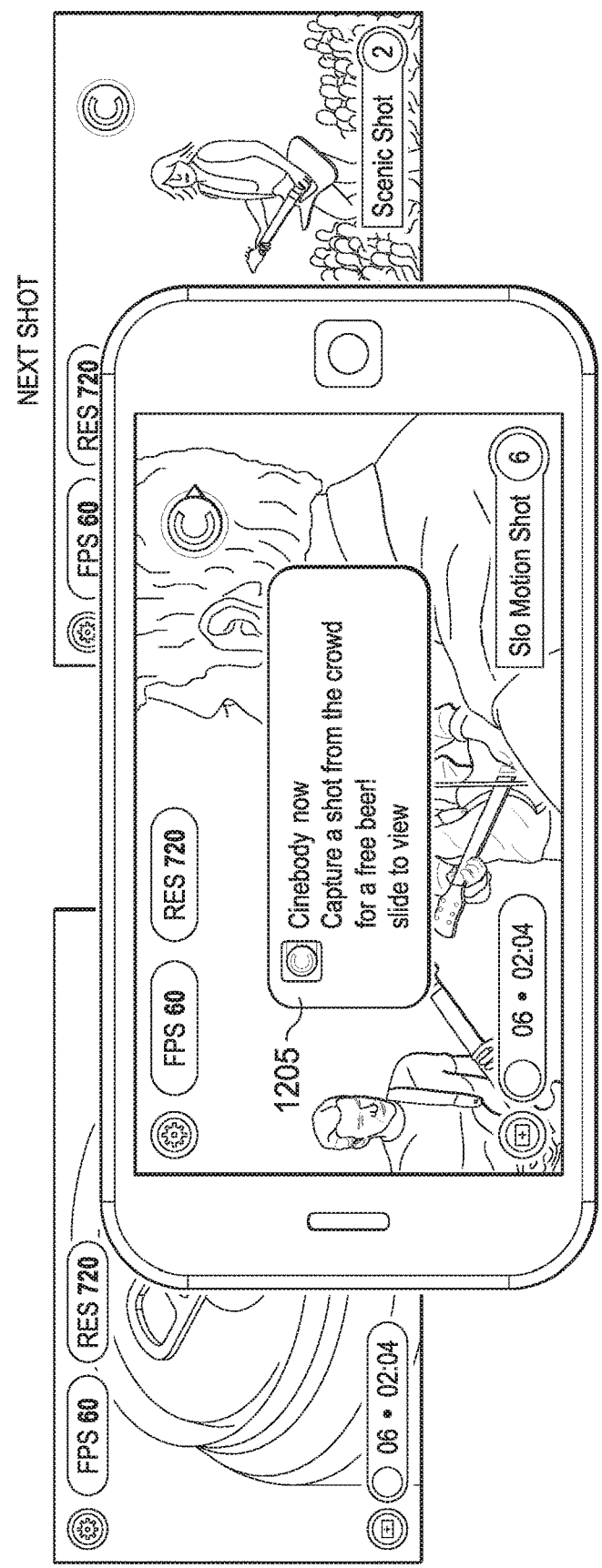
FIG. 12 is an exemplary screenshot of a downloadable software application for an image capture device depicting a user notification to capture footage.

FIG. 12 shows a screenshot of mobile application that is similar to the mobile application described in FIG. 2, but which has additional shot list features. The "shot list" itself refers to a predetermined set of types and numbers of shot templates that the campaign creators would ideally like to obtain from a particular user. In FIG. 12, a suggested shot notification 1205 appears in the app while the user has the app open to shoot footage. This particular notification 1205 indicates that the user can capture a shot from the crowd for a free beer. Campaign creators may be the owners or operators of events at which campaigns are conducted. In the example shown in FIGS. 12 and 14, the location is a concert, and the campaign creator may be the venue hosting the concert. The campaign creator may want to provide positive incentives such as free food, beverages, or merchandise to encourage users to collect the desired footage. The notification 1205 shown tells the user to "slide to view" the current suggested shot template, details of which will be viewable if the user swipes on the notification 1205.

Figure 13:
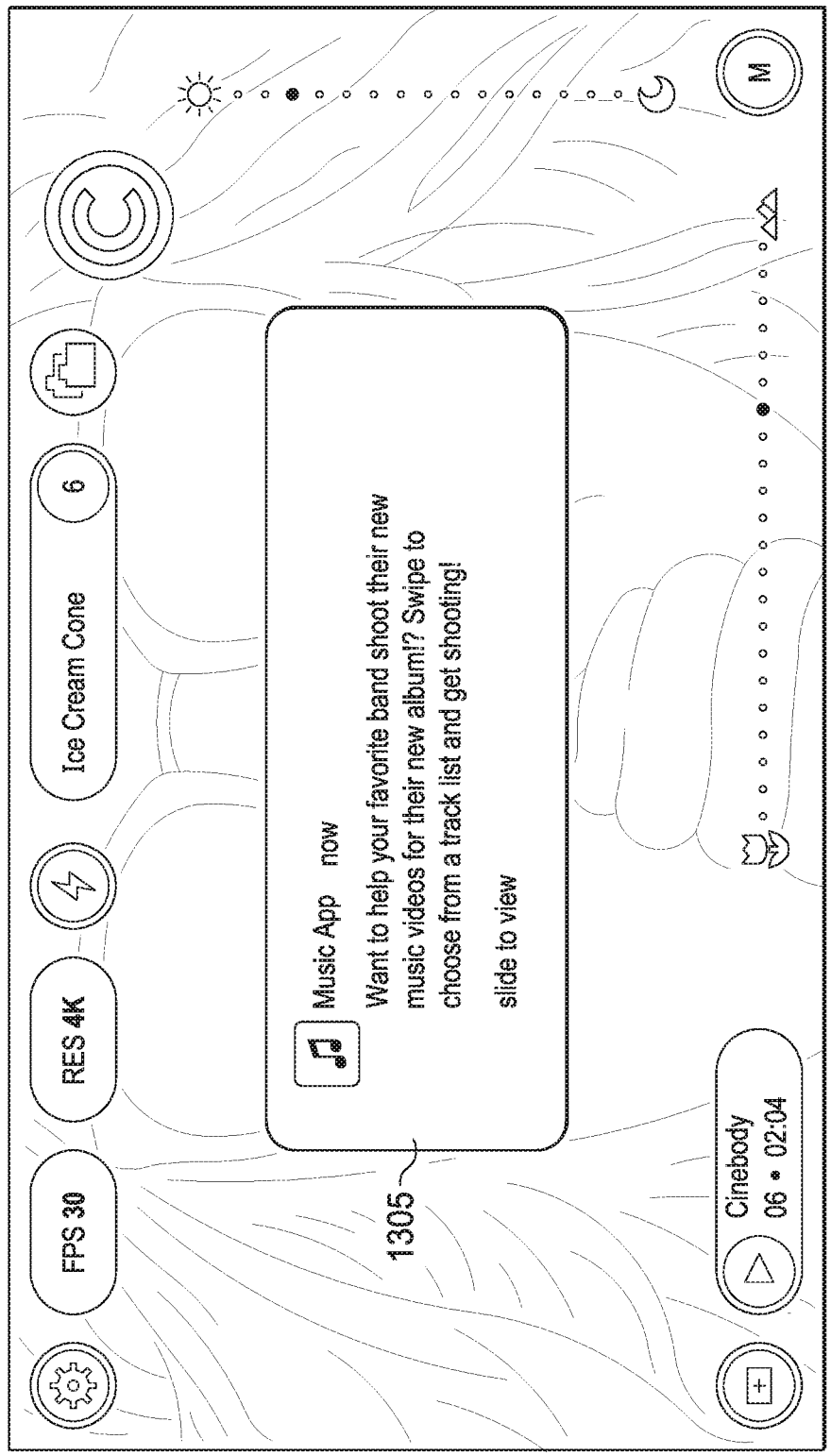
FIG. 13 is an exemplary screenshot of a downloadable software application for an image capture device depicting another example of a user notification.

Another example of a shot notification is shown in FIG. 13. In FIG. 13, a shot notification appears as a prompt for a user who has a music application and is listening to music from a particular band. The campaign in this case may be set up to help the band capture content from its fans.

Figure 14:
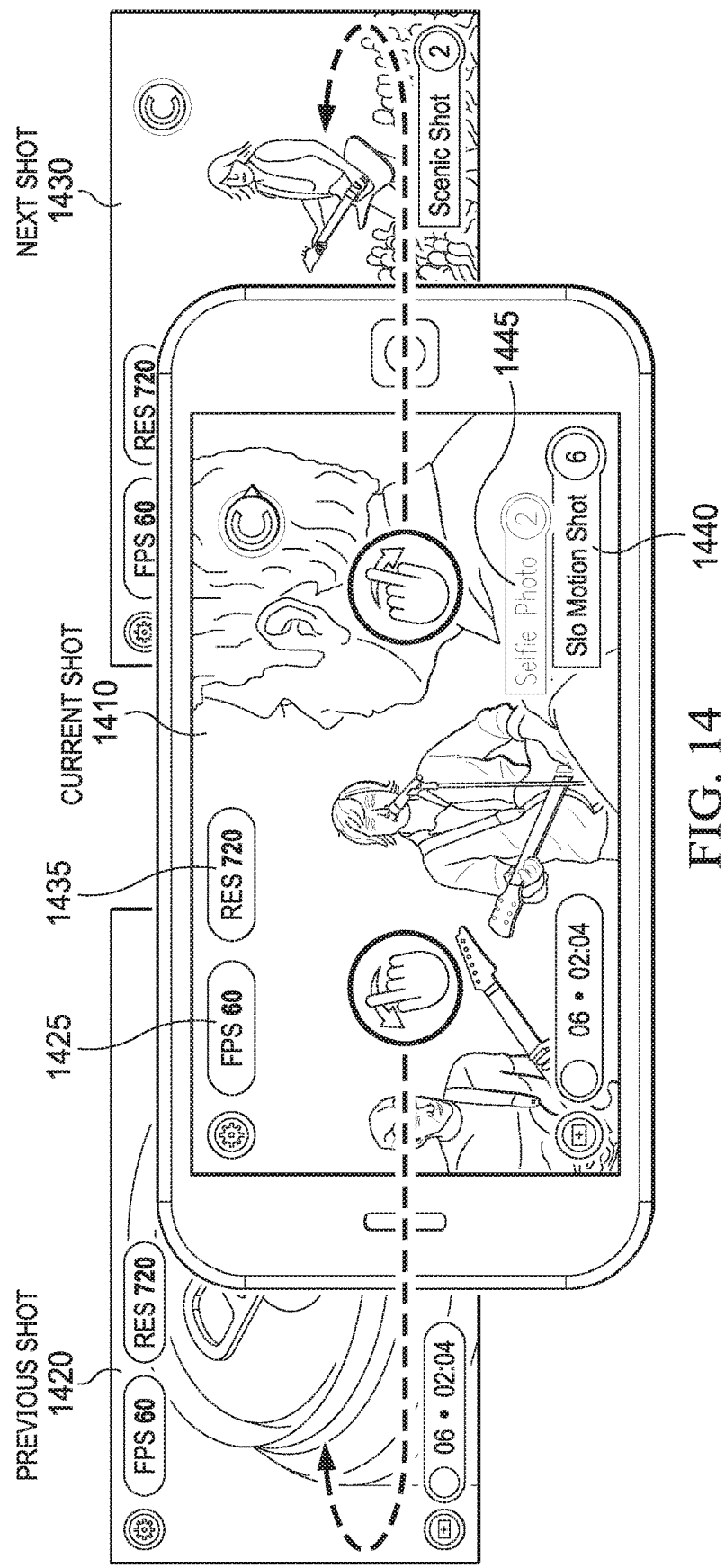
FIG. 14 is an exemplary screenshot of a downloadable software application for an image capture device depicting features of a campaign shot list comprising suggested shot templates.

FIG. 14 shows three suggested shot templates of the shot list. For the purposes of the disclosure, a "suggested shot template," or simply, "shot template" is a set of creative direction for a particular shot desired by a curator, which may include 1) suggested content and 2) default camera settings. Any kind of creative or technical direction, including suggested content and camera settings, may be referred to as "shot specifications." "Suggested content" may also be referred to as the "subject" of a shot template. A current shot template 1410 shows the suggested content of one of the suggested shot templates. In this example, the suggested content is "from the crowd," so the current shot template 1410 shows just that. A user can then swipe left or right on the touchscreen to view other suggested shot templates. A "previous" shot template 1420 shows an example of a different kind of suggested content—in this case, the suggestion is for a "macro" shot, meaning a close up of a particular item. Similarly, a "next" shot template 1430 shows suggested "scenic" content. Any number of suggested shot templates may be made available to contributors, and a variety of incentives may be provided to reward users for taking the shots. In many embodiments, the captured shots will be automatically uploaded to the cloud service.

Figure 15:
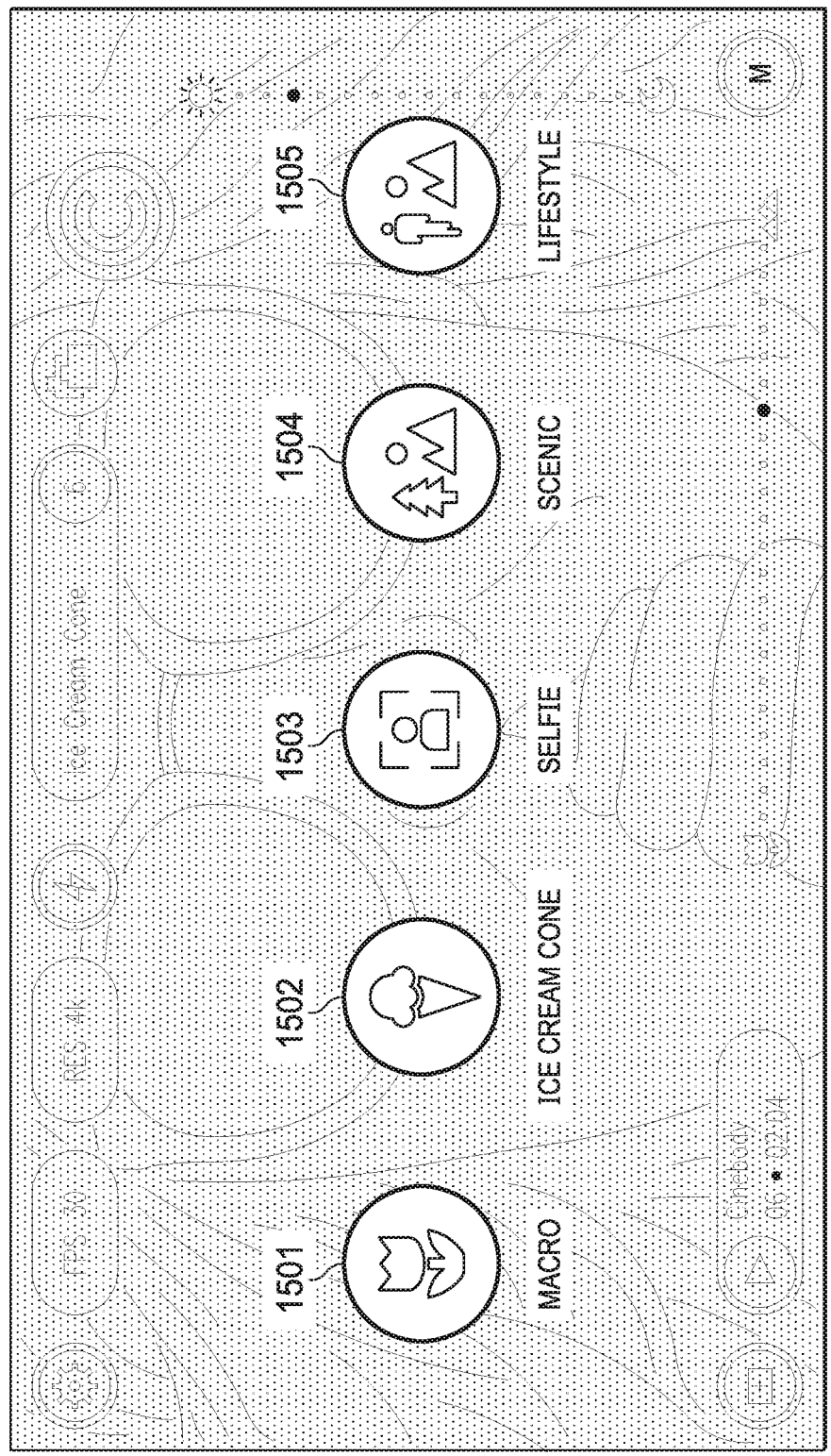
FIG. 15 is an exemplary screenshot of a downloadable software application for an image capture device depicting several shot templates of a campaign shot list.

FIG. 15 shows an example of a shot list comprising a set of shot templates 1501-1505. As shown, the shot templates are directed to a "macro" subject 1501, an "ice cream cone" subject 1502, a "selfie" subject 1503, a "scenic" subject 1504, and a "lifestyle" subject 1505. When a contributor selects one of the shot templates, various screens and prompts may appear providing further direction and the actual interface for capturing the shot.

Figure 16:
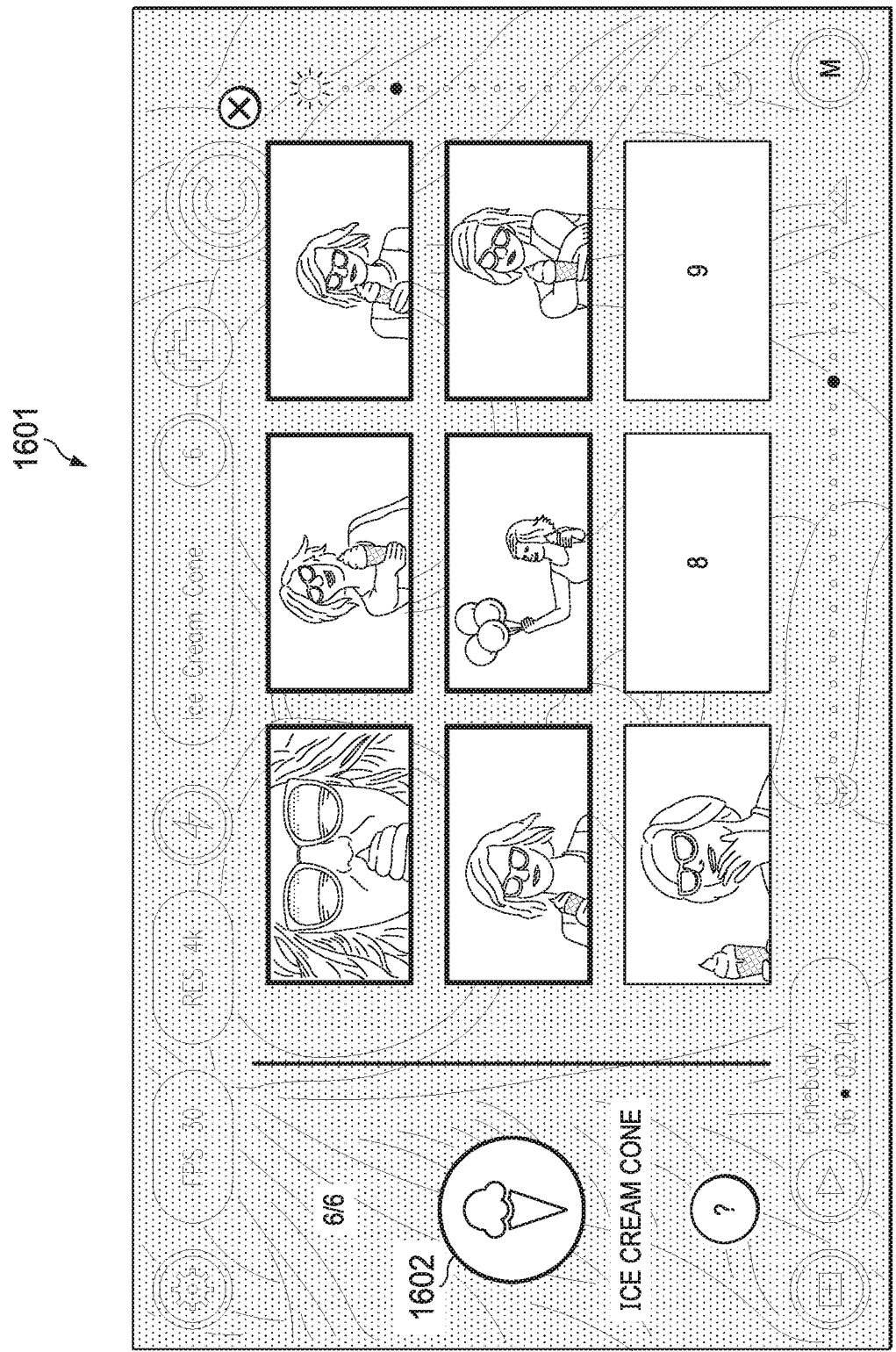
FIG. 16 is an exemplary screenshot of a downloadable software application for an image capture device depicting a local folder for captured shots of a particular shot template.

A contributor may view captured shots for a particular shot template in a local folder as shown in FIG. 16. The folder 1601 shows a series of captured shots under the shot template title 1602 "ice cream." As shown, the contributor has captured seven shots, but the shot template only requests six. The first six are highlighted, and the contributor may move other captured shots into the highlighted regions to select them as shot submissions. It is contemplated that in some embodiments, the first six (for example) captured shots for a particular shot template may be automatically uploaded, but in other embodiments, the user may select the captured shots for submission and then upload them all at once.

Figure 17:
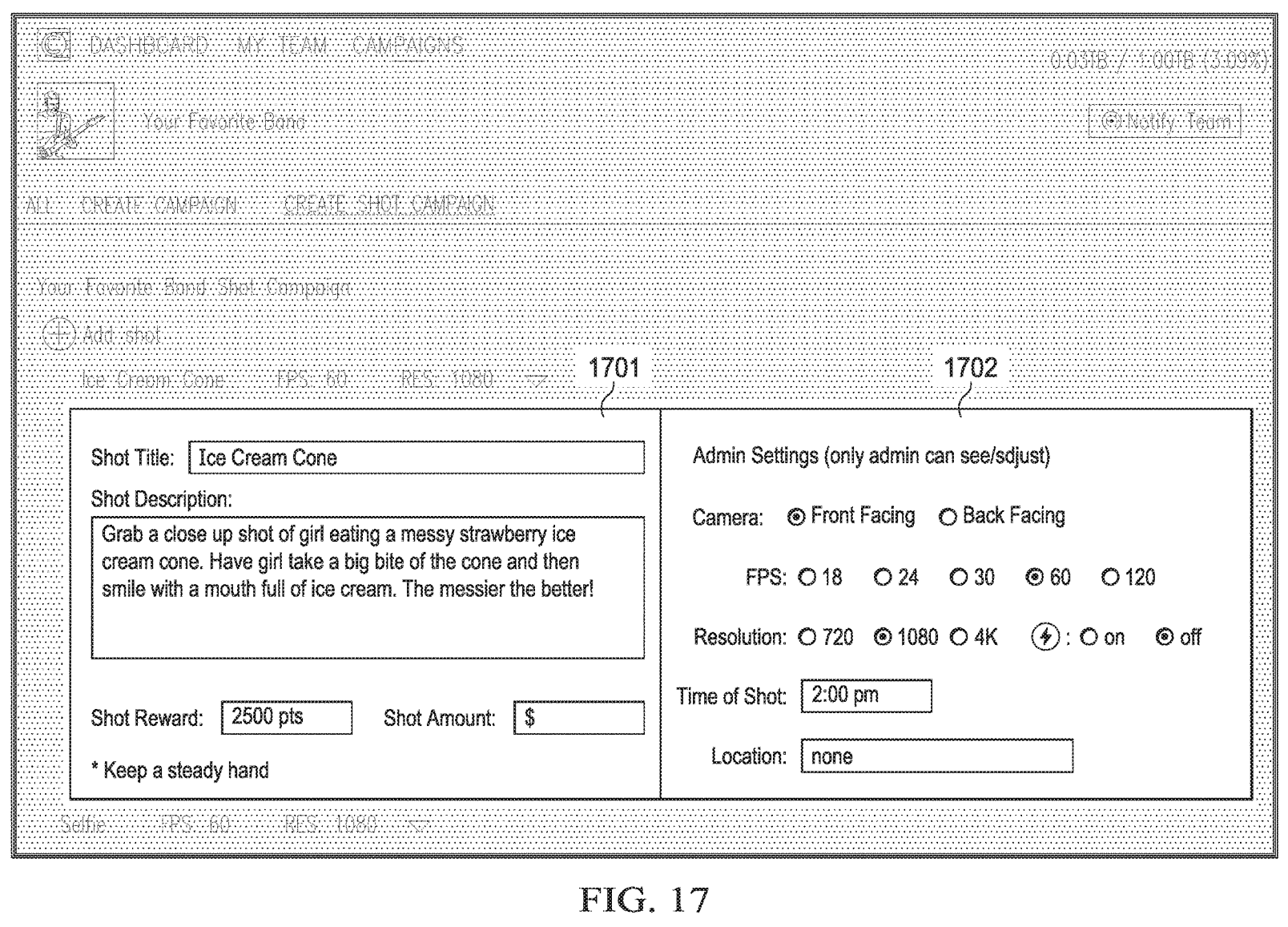

The type, quality, and quantity of suggested shot templates in a shot list may be set up by the organization implementing the campaign and may be customizable on multiple levels. FIG. 17 shows an exemplary dashboard view that allows a curator to enter a number of shot specifications for a shot list. As shown, shot specifications may be entered on a shot curation interface 1701. These specifications may include a shot title, description, an incentive or reward for the contributor, a number of requested shots, and other notes. Shot specifications may also be entered on a camera settings screen 1702, which may include a camera orientation, a frame rate and a resolution. Other specifications may be added, such as a requested time to take a shot or a location. Another type of specification may comprise a "look" or a visual filter, such as a set variation in color, lighting, or contrast, for example. Such variations are known in the art of digital photo editing applications as filters. The shot templates of the present disclosure may include such filters as a shot specification of a shot template or entire shot list.

The system of the disclosure may allow customization of shot lists by providing a number of suggested shot templates that a campaign creator can choose from to create a shot list. A campaign creator may be able to view, for example, several dozen suggested shot templates, and then choose six to ten of them to include in a particular shot list. Alternatively, the campaign creator may be able to create a customized suggested shot template; that is, the campaign creator can choose the desired suggested content and camera settings of a shot that are different from the existing suggested shot templates in order to customize the overall shot list and have a high level of creative direction. The campaign creator can create and include one or more customized suggested shot templates, if desired, or can make an entire shot list out of customized shot templates.

Another option that is available to campaign creators is to choose an entire shot list template, rather than choosing individual shot templates to combine into a shot list. A campaign creator need not customize a shot list at all, but may instead pick from, for example, a dozen shot list templates each containing four to eight suggested preselected shot templates. This option allows easy set-up of a campaign, which may be helpful for organizations that are inexperienced at setting up shot lists or which run a large number of campaigns and may not want to customize shot lists every time. Shot list templates may be creatively directed according to a theme (e.g., rustic), a mood (e.g., energetic), an event e.g., football game), or a brand (e.g., XYZ Fast Food Company). Essentially, a shot list template may be creatively directed to match any kind of campaign, and may allow an organization to quickly and easily set up professional-looking campaigns and obtain ideal shots from contributors.

Turning back to FIG. 14, another aspect of the disclosure, is that suggested the shot templates, which may specify camera settings, may automatically change the settings to those specified by the template when the shot template is selected. For example, the frame rate 1425 and resolution 1435 in the current shot 1410 are set at 60 FPS and RES 720. If the contributor swipes to another shot template (i.e., the previous shot template 1420 or next shot template 1430), and the frame rate or resolution is different, the mobile app automatically changes the camera settings without the contributor having to do anything else. Any kind of camera setting may be automatically changed. For example, if the shot template requires a slow-motion setting, or a reverse camera orientation (i.e., "selfie") setting, these may be automatically activated as soon as the contributor swipes to the suggested shot template.

The shot list may also include visual indicators that show how many of one type of shot template is being requested by a curator of the shot list. The app has a first shot number indicator 1440 showing that six slow motion shots are requested, and a second shot number indicator 1445 showing that two selfie photos are being requested. The shot number indicators may be used to encourage a contributor to take several versions of the same shot template so that the curator can choose from multiple ones in an editing process. In some embodiments, contributors may be rewarded differently if they reach certain goals, such as taking one shot for each shot template, or taking all the requested shots available in a campaign. The number of shots for each template may be specified in order to limit the number of shots that a contributor may take and upload per campaign. When many contributors are taking photos and videos for one campaign, the amount of digital media collected can quickly grow to the point where it is too much to store or practically sort through for an edit.

Figure 18:
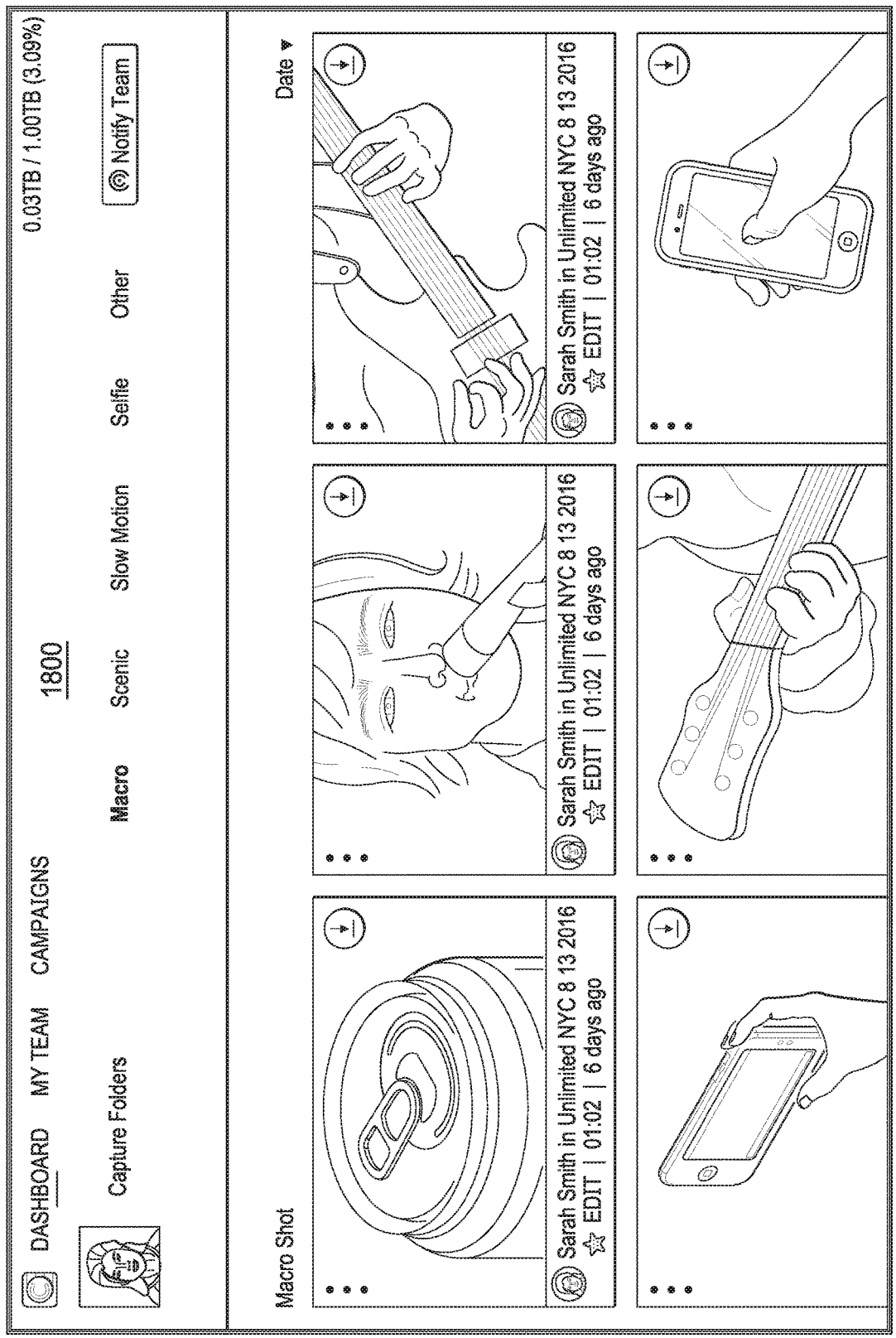
FIG. 18 is an exemplary screenshot of a web interface of the present disclosure depicting images sorted into capture folders.

Once shots are gathered by contributors of a campaign and automatically uploaded to the cloud server, the cloud server may implement a file categorization component (e.g., file categorization component 191 of FIG. 1B) to automatically sort each shot into a "capture folder." FIG. 18 shows a capture folder screen 1800 of the dashboard. Each capture folder may organize shots taken with the same shot template by multiple users into individual folders. For the system in general, shots may be uploaded to the server and time-stamped, which may result in their default display on a dashboard in the order they were uploaded. As described previously, curators may sort shots uploaded through campaigns according to a number of various criteria, such as by user, by campaign, by tag, by date, etc. The sorting by shot template allows faster edit creation by curators, who may look through particular capture folders in order to find the best shots of a certain template to include in an edit, rather than looking through digital media sorted in another way.

Another aspect of the disclosure is that the dashboard may include "automatic edit creation" features and functionality in order to streamline the process of creating edits from gathered digital media. Typically, editing large amounts of captured footage is a long and time-consuming process. Editing photos and/or videos into a final produced visual work is often a several-day or several-week process. In video production, for example, a production company would have to capture digital footage, download it from a memory card onto a computer, and then spend time looking through each clip to determine which shots are the "select" shots from which the final edit will be compiled. Often, editors may be searching for a particular type of shot, such as a slow motion shot. In traditional video editing, an editor would have to look through all the regular-speed and slow-motion shots in order to separate the slow-motion shots into one place from which to further select them. Although certain tools for automatic editing exist in the art, they often involve analyzing pixel ratios to identify movement, and then automatically linking footage together based on this analysis. Such automatic editing tools often produce unsatisfactory results and reveal a lack of human input.

Figure 19:
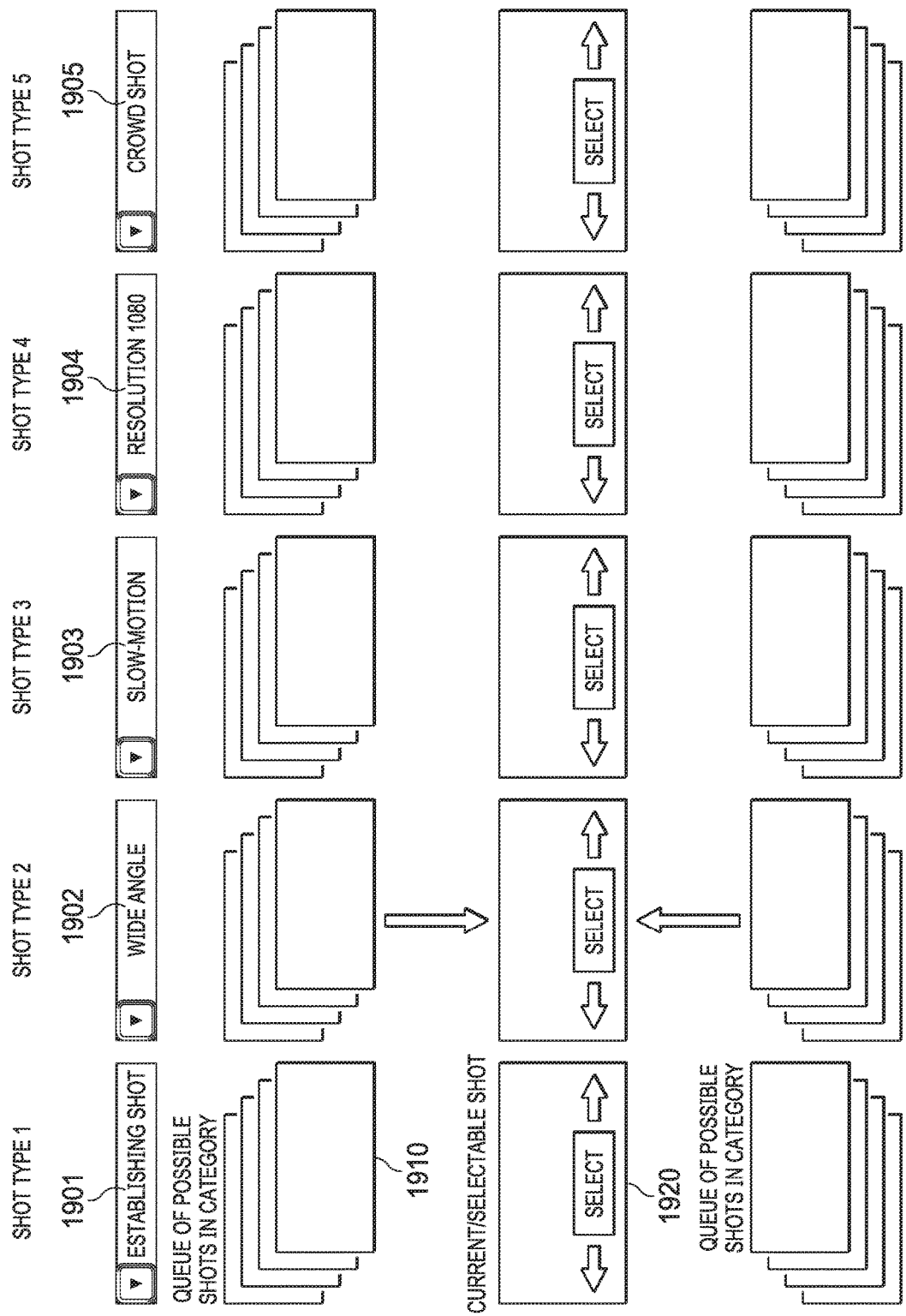
FIG. 19 is an exemplary web interface of the present disclosure depicting functions of an automatic editor.

The automatic edit creation features and functions of the present disclosure allow editors to eliminate time spent selecting and organizing footage. They also allow human input and creativity to be preserved even though portions of the process are automated. FIG. 19 shows an exemplary automatic edit creating interface in accordance with the disclosure. The layout may differ in some embodiments, but the features and functions described with reference to FIG. 19 may apply to a number of different layouts. Each particular edit may comprise a plurality of shots (of digital media) that are ultimately linked together to create one video or slideshow (i.e., edit). Organizations may want to produce campaigns whose final edits follow a particular format of types of shots. In the example shown, there are five categories of "shot type," which in this case are an Establishing Shot 1901, a Wide Angle Shot 1902, a Slow Motion shot 1903, a Resolution 1080 shot 1904, and a Crowd Shot 1905. These "shot types" may be the same or different from the "shot templates" described with reference to smart campaigns. As shown, each shot type is chosen from a drop-down menu, to indicate that a number of shot types may be chosen from for each position in the edit. Shot types may include any kind of criteria by which shots may be categorized or sorted. Any of the sorting criteria described throughout the disclosure may be a selectable "shot type," including features of the digital media itself (e.g., frame rate, resolution, slow motion,) user data (e.g., particular user, users in a particular demographic group), environmental data (e.g., geolocation, time), or subject tags. Though five shot types are shown in the present example, more or fewer shot types may be used in a particular edit. For example, a user could add a sixth or seventh shot type, and some shot types may be repeated.

When an editor selects the shot types they want to include in the edit, each of the available shots that fall into each category may be lined up into a queue 1910. This automatic organization of shots may drastically reduce the time an editor has to spend searching for desired shots. The interface may include a row of current/selectable shots that appear in a row. Each current/selectable shot may have interactive controls (e.g. buttons, touchscreen responsiveness) that allow a user to swipe or click through to a next available shot in the queue 1910, or otherwise select the current/selectable shot 1920 for inclusion in the edit. As shown, if a user clicks or swipes left or right, another shot from the same shot type list will replace the current/selectable shot 1920, and the shot that was not chosen will be put back into the queue, though it still may be re-selected and included later. The shots in the queue 1910 are shown above and below the current/selectable shot row to illustrate that the available shots of a shot type may be organized in a particular order. For example, they may be organized chronologically by when they were taken or by the length of the clip, for example. In the example shown, the shots in the queue for each shot type give a quick visual indicator of how many shots of each type are available for selection. Once an editor chooses the best shots from each of the shot types, the footage may be linked together to form a final edit. The interface shown can drastically reduce the time spent by an editor in selecting shots while allowing creative control over the final edit.

Figure 20:
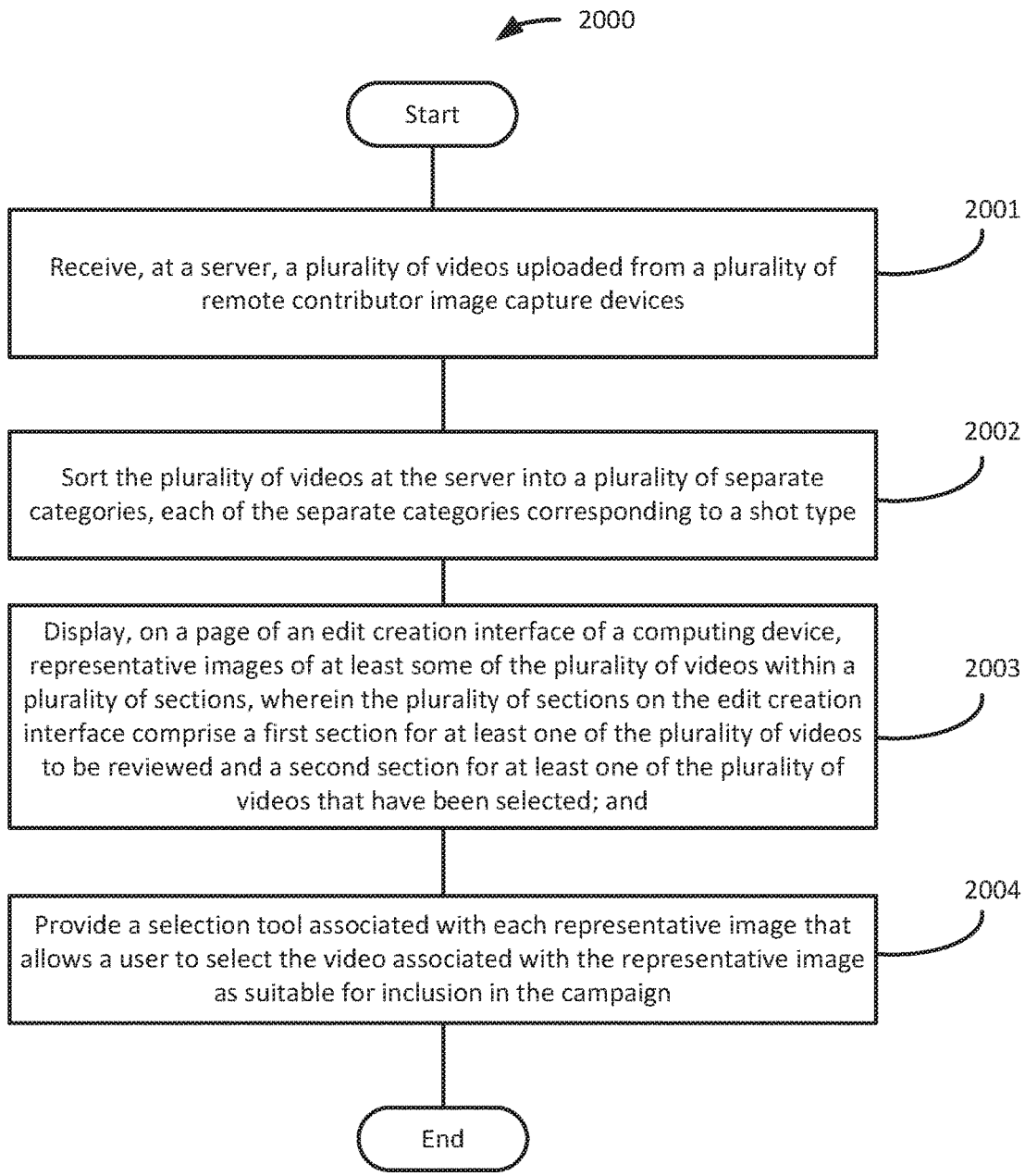
FIG. 20 is a flowchart depicting a method that may be traversed to implement aspects of the present disclosure.

FIG. 20 is a flowchart depicting a method according to the present disclosure. A method 2000 for creating a collaborative video campaign may comprise, at step 2001, receiving, at a server, a plurality of videos uploaded from a plurality of remote contributor image capture devices. The method may then comprise, at step 2002, sorting the plurality of videos at the server into a plurality of separate categories, each of the separate categories corresponding to a shot type. The method may further comprise, at step 2003, displaying, on a page of an edit creation interface of a computing device, representative images of at least some of the plurality of videos within a plurality of sections, wherein the plurality of sections on the edit creation interface comprise a first section for at least one of the plurality of videos to be reviewed and a second section for at least one of the plurality of videos that have been selected. At step 2004, the method may comprise providing a selection tool associated with each representative image that allows a user to select the video associated with the representative image as suitable for inclusion in the campaign.

Figure 21:
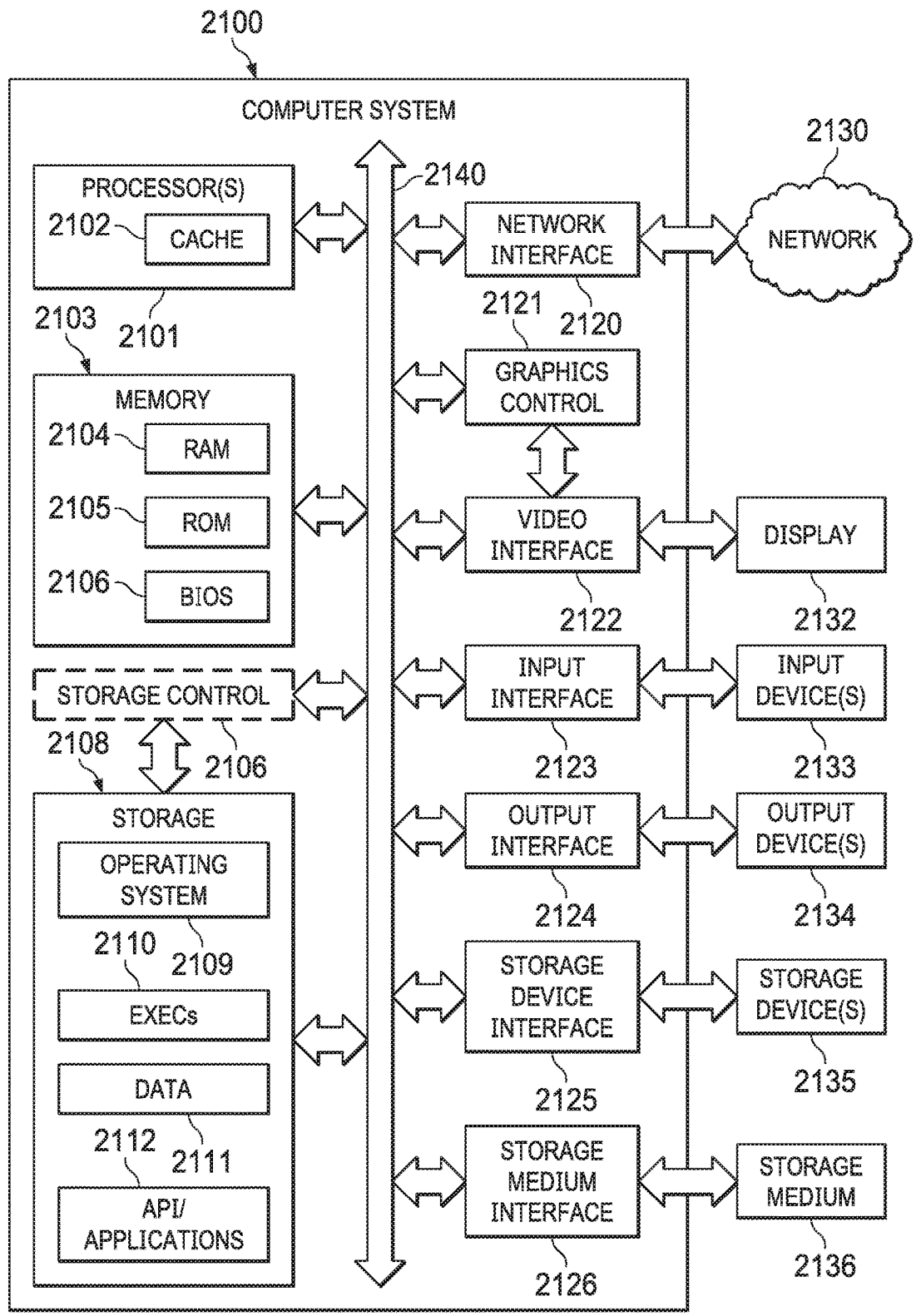
FIG. 21 is a block diagram of a computing device that may implement aspects of the present disclosure.

Referring next to FIG. 21, it is a block diagram depicting an exemplary machine that includes a computer system 2100 within which a set of instructions can execute for causing a device to perform or execute any one or more of the aspects and/or methodologies for static code scheduling of the present disclosure. The components in FIG. 21 are examples only and do not limit the scope of use or functionality of any hardware, software, embedded logic component, or a combination of two or more such components implementing particular embodiments.

Computer system 2100 may include a processor 2101, a memory 2103, and a storage 2108 that communicate with each other, and with other components, via a bus 2140. The bus 2140 may also link a display 2132, one or more input devices 2133 (which may, for example, include a keypad, a keyboard, a mouse, a stylus, etc.), one or more output devices 2134, one or more storage devices 2135, and various tangible storage media 2136. All of these elements may interface directly or via one or more interfaces or adaptors to the bus 2140. For instance, the various tangible storage media 2136 can interface with the bus 2140 via storage medium interface 2126. Computer system 2100 may have any suitable physical form, including but not limited to one or more integrated circuits (ICs), printed circuit boards (PCBs), mobile handheld devices (such as mobile telephones or PDAs), laptop or notebook computers, distributed computer systems, computing grids, or servers.

Processor(s) 2101 (or central processing unit(s) (CPU(s))) optionally contains a cache memory unit 2102 for temporary local storage of instructions, data, or computer addresses. Processor(s) 2101 are configured to assist in execution of computer readable instructions. Computer system 2100 may provide functionality for the components depicted in FIG. 1 as a result of the processor(s) 2101 executing non-transitory, processor-executable instructions embodied in one or more tangible computer-readable storage media, such as memory 2103, storage 2108, storage devices 2135, and/or storage medium 2136. The computer-readable media may store software that implements particular embodiments, and processor(s) 2101 may execute the software. Memory 2103 may read the software from one or more other computer-readable media (such as mass storage device(s) 2135, 2136) or from one or more other sources through a suitable interface, such as network interface 2120. The software may cause processor(s) 2101 to carry out one or more processes or one or more steps of one or more processes described or illustrated herein. Carrying out such processes or steps may include defining data structures stored in memory 2103 and modifying the data structures as directed by the software.

The memory 2103 may include various components (e.g., machine readable media) including, but not limited to, a random access memory component (e.g., RAM 2104) (e.g., a static RAM "SRAM", a dynamic RAM "DRAM, etc.), a read-only component (e.g., ROM 2105), and any combinations thereof. ROM 2105 may act to communicate data and instructions unidirectionally to processor(s) 2101, and RAM 2104 may act to communicate data and instructions bidirectionally with processor(s) 2101. ROM 2105 and RAM 2104 may include any suitable tangible computer-readable media described below. In one example, a basic input/output system 2106 (BIOS), including basic routines that help to transfer information between elements within computer system 2100, such as during start-up, may be stored in the memory 2103.

Fixed storage 2108 is connected bidirectionally to processor(s) 2101, optionally through storage control unit 2107. Fixed storage 2108 provides additional data storage capacity and may also include any suitable tangible computer-readable media described herein. Storage 2108 may be used to store operating system 2109, EXECs 2110 (executables), data 2111, API applications 2112 (application programs), and the like. Often, although not always, storage 2108 is a secondary storage medium (such as a hard disk) that is slower than primary storage (e.g., memory 2103). Storage 2108 can also include an optical disk drive, a solid-state memory device (e.g., flash-based systems), or a combination of any of the above. Information in storage 2108 may, in appropriate cases, be incorporated as virtual memory in memory 2103.

In one example, storage device(s) 2135 may be removably interfaced with computer system 2100 (e.g., via an external port connector (not shown)) via a storage device interface 2125. Particularly, storage device(s) 2135 and an associated machine-readable medium may provide nonvolatile and/or volatile storage of machine-readable instructions, data structures, program modules, and/or other data for the computer system 2100. In one example, software may reside, completely or partially, within a machine-readable medium on storage device(s) 2135. In another example, software may reside, completely or partially, within processor(s) 2101.

Bus 2140 connects a wide variety of subsystems. Herein, reference to a bus may encompass one or more digital signal lines serving a common function, where appropriate. Bus 2140 may be any of several types of bus structures including, but not limited to, a memory bus, a memory controller, a peripheral bus, a local bus, and any combinations thereof, using any of a variety of bus architectures. As an example, and not by way of limitation, such architectures include an Industry Standard Architecture (ISA) bus, an Enhanced ISA (EISA) bus, a Micro Channel Architecture (MCA) bus, a Video Electronics Standards Association local bus (VLB), a Peripheral Component Interconnect (PCI) bus, a PCI-Express (PCI-X) bus, an Accelerated Graphics Port (AGP) bus, HyperTransport (HTX) bus, serial advanced technology attachment (SATA) bus, and any combinations thereof.

Computer system 2100 may also include an input device 2133. In one example, a user of computer system 2100 may enter commands and/or other information into computer system 2100 via input device(s) 2133. Examples of an input device(s) 2133 include, but are not limited to, an alpha-numeric input device (e.g., a keyboard), a pointing device (e.g., a mouse or touchpad), a touchpad, a joystick, a gamepad, an audio input device (e.g., a microphone, a voice response system, etc.), an optical scanner, a video or still image capture device (e.g., a camera), and any combinations thereof. Input device(s) 2133 may be interfaced to bus 2140 via any of a variety of input interfaces 2123 (e.g., input interface 2123) including, but not limited to, serial, parallel, game port, USB, FIREWIRE, THUNDERBOLT, or any combination of the above.

In particular embodiments, when computer system 2100 is connected to network 2130, computer system 2100 may communicate with other devices, specifically mobile devices and enterprise systems, connected to network 2130. Communications to and from computer system 2100 may be sent through network interface 2120. For example, network interface 2120 may receive incoming communications (such as requests or responses from other devices) in the form of one or more packets (such as Internet Protocol (IP) packets) from network 2130, and computer system 2100 may store the incoming communications in memory 2103 for processing. Computer system 2100 may similarly store outgoing communications (such as requests or responses to other devices) in the form of one or more packets in memory 2103 and communicated to network 2130 from network interface 2120. Processor(s) 2101 may access these communication packets stored in memory 2103 for processing.

Examples of the network interface 2120 include, but are not limited to, a network interface card, a modem, and any combination thereof. Examples of a network 2130 or network segment 2130 include, but are not limited to, a wide area network (WAN) (e.g., the Internet, an enterprise network), a local area network (LAN) (e.g., a network associated with an office, a building, a campus or other relatively small geographic space), a telephone network, a direct connection between two computing devices, and any combinations thereof. A network, such as network 2130, may employ a wired and/or a wireless mode of communication. In general, any network topology may be used.

Information and data can be displayed through a display 2132. Examples of a display 2132 include, but are not limited to, a liquid crystal display (LCD), an organic liquid crystal display (OLED), a cathode ray tube (CRT), a plasma display, and any combinations thereof. The display 2132 can interface to the processor(s) 2101, memory 2103, and fixed storage 2108, as well as other devices, such as input device(s) 2133, via the bus 2140. The display 2132 is linked to the bus 2140 via a video interface 2122, and transport of data between the display 2132 and the bus 2140 can be controlled via the graphics control 2121.

In addition to a display 2132, computer system 2100 may include one or more other peripheral output devices 2134 including, but not limited to, an audio speaker, a printer, and any combinations thereof. Such peripheral output devices may be connected to the bus 2140 via an output interface 2124. Examples of an output interface 2124 include, but are not limited to, a serial port, a parallel connection, a USB port, a FIREWIRE port, a THUNDERBOLT port, and any combinations thereof.

In addition, or as an alternative, computer system 2100 may provide functionality as a result of logic hardwired or otherwise embodied in a circuit, which may operate in place of or together with software to execute one or more processes or one or more steps of one or more processes described or illustrated herein. Reference to software in this disclosure may encompass logic, and reference to logic may encompass software. Moreover, reference to a computer-readable medium may encompass a circuit (such as an IC) storing software for execution, a circuit embodying logic for execution, or both, where appropriate. The present disclosure encompasses any suitable combination of hardware, software, or both.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for creating a collaborative video campaign, the method comprising:
   receiving, at a server, a plurality of videos uploaded from a plurality of remote contributor image capture devices,
   sorting the plurality of videos at the server into a plurality of separate categories, each of the separate categories corresponding to a shot type;
   displaying, on a page of an edit creation interface of a computing device, representative images of at least some of the plurality of videos within a plurality of sections,
   wherein the plurality of sections on the edit creation interface comprise:
     a first section for at least one of the plurality of videos to be reviewed; and
     a second section for at least one of the plurality of videos that have been selected; and
   providing a selection tool associated with each representative image that allows a user to select the video associated with the representative image as suitable for inclusion in the campaign.

2. The method of claim 1, further comprising:
   providing a download button associated with each representative image; and
   downloading at least one of the plurality of videos from the server to the computing device displaying the edit creation interface.

3. The method of claim 1, wherein the plurality of sections on the edit creation interface further comprise a third section for at least one of the plurality of videos that have been reviewed but not selected.

4. The method of claim 1, wherein a shot type comprises a shot specification, the shot specifications comprising:
   a description of a desired subject of a particular video.

5. The method of claim 1, wherein a shot type comprises:
   a description of one or more desired camera settings used to shoot a particular video.

6. The method of claim 1, wherein each of the plurality of videos displayed on the page of the edit creation interface in the first section and second section correspond to a same category at the server.

7. The method of claim 1, further comprising:
   automatically linking selected videos together into an edited compilation video.

8. A platform for creating collaborative video campaigns, the platform comprising:
   a first application executed at one or more remote contributor image capture devices, the first application configured to capture and upload one or more videos,
   a second application executed at a remote server configured to:
     sort a plurality of videos at the server into a plurality of separate categories, each of the separate categories corresponding to a shot type; and
   a third application executed at a computing device configured to:
     display, on a page of an edit creation interface, representative images of at least some of the plurality of videos within a plurality of sections,
     wherein the plurality of sections on the edit creation interface comprise:
       a first section for at least one of the plurality of videos to be reviewed; and
       a second section for at least one of the plurality of videos that have been selected; and
     provide a selection tool associated with each representative image that allows a user to select the video associated with the representative image as suitable for inclusion in the campaign.

9. The platform of claim 8, wherein the third application is further configured to:
   provide a download button associated with each representative image; and
   download at least one of the plurality of videos from the server to the computing device displaying the edit creation interface.

10. The platform of claim 8, wherein the plurality of sections on the edit creation interface further comprise a third section for at least one of the plurality of videos that have been reviewed but not selected.

11. The platform of claim 8, wherein a shot type comprises a shot specification, the shot specifications comprising:
    a description of a desired subject of a particular video.

12. The platform of claim 8, wherein each of the plurality of videos displayed on the page of the edit creation interface in the first section and second section correspond to a same category at the server.

13. The platform of claim 8, wherein the third application is further configured to:
    automatically link selected videos together into an edited compilation video.

14. A non-transitory, tangible, computer readable storage medium, encoded with processor readable instructions to perform a method for creating a collaborative video campaign, the method comprising:
    receiving, at a server, a plurality of videos uploaded from a plurality of remote contributor image capture devices,
    sorting the plurality of videos at the server into a plurality of separate categories, each of the separate categories corresponding to a shot type;
    displaying, on a page of an edit creation interface of a computing device, representative images of at least some of the plurality of videos within a plurality of sections,
    wherein the plurality of sections on the edit creation interface comprise:
      a first section for at least one of the plurality of videos to be reviewed; and
      a second section at least one of the plurality of videos that have been selected; and
    providing a selection tool associated with each representative image that allows a user to select the video associated with the representative image as suitable for inclusion in the campaign.

15. The non-transitory, tangible, computer readable storage medium of claim 14, wherein the method further comprises:
    providing a download button associated with each representative image; and
    downloading at least one of the plurality of videos from the server to the computing device displaying the edit creation interface.

16. The non-transitory, tangible, computer readable storage medium of claim 15, wherein the method further comprises:
    automatically linking selected videos together into an edited compilation video.

17. The non-transitory, tangible, computer readable storage medium of claim 14, wherein the plurality of sections on the edit creation interface further comprise a third section for at least one of the plurality of videos that have been reviewed but not selected.

18. The non-transitory, tangible, computer readable storage medium of claim 14, wherein a shot type comprises a shot specification, the shot specifications comprising:
    a description of a desired subject of a particular video.

19. The non-transitory, tangible, computer readable storage medium of claim 14, wherein a shot type comprises:
    a description of one or more desired camera settings used to shoot a particular video.

20. The non-transitory, tangible, computer readable storage medium of claim 14, wherein each of the plurality of videos displayed on the page of the edit creation interface in the first section and second section correspond to a same category at the server.

* * * * *